United States Patent [19]
Hussein et al.

[11] Patent Number: 6,148,046
[45] Date of Patent: Nov. 14, 2000

[54] BLIND AUTOMATIC GAIN CONTROL SYSTEM FOR RECEIVERS AND MODEMS

[75] Inventors: Ershad Hussein, Tokyo; Satoru Yamauchi, Tsuchiura, both of Japan

[73] Assignee: Texas Instruments Incorporated, Dallas, Tex.

[21] Appl. No.: 09/008,970

[22] Filed: Jan. 20, 1998

[51] Int. Cl.$^7$ .................................................. H04L 27/08
[52] U.S. Cl. ...................... 375/345; 375/371; 375/260; 341/139
[58] Field of Search ............................ 375/345, 371, 375/260; 360/46, 51; 341/110, 139

[56] References Cited

U.S. PATENT DOCUMENTS

| | | | |
|---|---|---|---|
| 4,355,402 | 10/1982 | Kromer, III et al. | 375/345 |
| 4,683,578 | 7/1987 | Betts et al. | 375/345 |
| 5,796,358 | 8/1998 | Shih et al. | 341/139 |
| 5,796,535 | 8/1998 | Tuttle et al. | 360/51 |

*Primary Examiner*—Stephen Chin
*Assistant Examiner*—Shuwang Liu
*Attorney, Agent, or Firm*—Tammy L. Williams; Wade James Brady, III; Frederick J. Telecky, Jr.

[57] ABSTRACT

The present invention is an apparatus and method for blind automatic gain control in a digital communications device. The present invention includes a maximum error detector (MED) (142) which includes a gain error evaluator (GEE) (144) and a maximum value detector (MVD) (146). Also included is a decision gain adjustor (DGA) (148) which includes a gain value controller (GVD) (150) and an initial value buffer (IVB) (152). The GEE (144) is operable to generate a gain error signal in accordance with an input baseband signal (x) and a sliced version of the input baseband signal (x'). The MVD (146) is operable to generate a renew signal in accordance with the sliced version of the input baseband signal (x') and a first predetermined reference value. The GVD (150) is operable to converge the gain error signal ($\Delta x$) in a first state using a first convergence technique and to converge the resultant signal in a second state using a second convergence technique. The IVB (152) is also used in generating the resultant output gain value signal from the converged gain error signal.

11 Claims, 17 Drawing Sheets x: UNSLICED BASEBAND SIGNAL
z: TRAINING SIGNAL
Δx: GAIN ERROR x: PASSBAND IF SIGNAL
x_bpf: BAND PASSED x
BPF: BAND PASS FILTER
D1: DELAY
G1, G2: GAINS
A1, A2: ADDERS x: UNSLICED BASEBAND SIGNAL
x': SLICED BASEBAND SIGNAL
Δx: GAIN ERROR
RENEW: SIGNAL FOR GAIN ADJUSTMENT

BLIND AUTOMATIC GAIN CONTROL SYSTEM FOR RECEIVERS AND MODEMS

TECHNICAL FIELD OF THE INVENTION

This invention is related to receivers and modems of both analog and digital communication technologies, such as QAM (Quadrature Amplitude Modulation), VSB (Vestigial SideBand) modulation, PSK (Phase-Shift Keying), OFDM (Orthogonal Frequency Division Multiplexing), etc., and in particular to the implementation of automatic gain control of such devices.

BACKGROUND OF THE INVENTION

Automatic gain control (AGC) systems, in both analog and digital receivers, correct linear attenuation of demodulated signals. There are, in general, two types of conventional AGC systems: (1) non-blind and (2) blind. In the non-blind AGC system, synchronization (or training) sequences, which are embedded periodically in the transmitted data, are used to perform AGC. The use of training sequences, however, not only reduces the available bandwidth for data transmission, but also requires that both the pattern and the length of the training sequences, generally as specified by standards, be pre-programmed into the receiver. Furthermore, in digital receivers, the use of training sequences causes clock jitters which increase bit error rate (BER).

In blind AGC systems, training signals are not used. The conventional blind AGC system performs AGC by estimating the average power of the center frequency component. This method, however, is not only slow but is also computationally expensive.

FIG. 1 shows a block diagram of a conventional non-blind AGC system 100. The conventional non-blind AGC system 100 includes a gain error detection block 102 and a gain adjustment block 108. The gain error detection block 102 includes a synchronization detector 104 and a gain error evaluator 106. The gain adjustment block 108 includes a gain value controller 110.

In the AGC system 100 shown in FIG. 1, training sequences, as shown in the exemplary signal frame sequence for a non-blind AGC system shown in FIG. 2(A), are used. A training sequence contains a series of maximum and minimum possible values for demodulated baseband signals. In the gain error detection block 102, the synchronization detector 104 detects the training sequence, and the gain error evaluator 106 evaluates the gain error of the received signal. In the gain adjustment block 108, the gain value controller 110 outputs a gain value to compensate for the gain error as determined by the gain error evaluator 106. However, as shown in FIG. 2(A), the training sequence used for this system consumes a significant portion of the bandwidth. In addition, the training sequence must be pre-programmed or pre-defined in the synchronization detector 104.

FIG. 3 shows a conventional blind AGC system 120. In this system, as illustrated by the exemplary signal frame sequence for a blind AGC system in FIG. 2(B), training sequences are not used. The conventional blind AGC system 120 instead includes a bandpass filter (BPF) 122, a comparator module 124 (which includes comparator C1 126), and a low pass filter (LPF)/integrator module 127. The BPF 122 detects the power of the center frequency of the received passband signal x. The comparator C1 126 then compares the power of the band passed signal x_bpf with an ideal average power. Then the LPF 127 (which includes negative gains G1 128 and G2 130, adders A1 134 and A2 132, and delay 136) both adjusts and smoothes the resulting output gain value from the comparator C1 126. One disadvantage of this type of system, however, is that it is very slow both in converging and in responding to abrupt changes in channel attenuation. Furthermore, computation of the BPF 122 is costly.

What is needed is a method and system for blind AGC which outperforms the conventional AGC in terms of both cost and performance.

SUMMARY OF THE INVENTION

The present invention is a blind automatic gain control system and method operable to detect maximum or minimum (i.e. maximum absolute) values of demodulated baseband signals, evaluate gain error, control output gain value to compensate for the gain error, and renew the output gain value in accordance with detected changes in the gain error. The present invention is further operable to distinguish burst noises from a genuine gain error change.

These and other features of the invention that will be apparent to those skilled in the art from the following detailed description of the invention, taken together with the accompanying drawings.

DETAILED DESCRIPTION OF THE INVENTION

Figure 1:
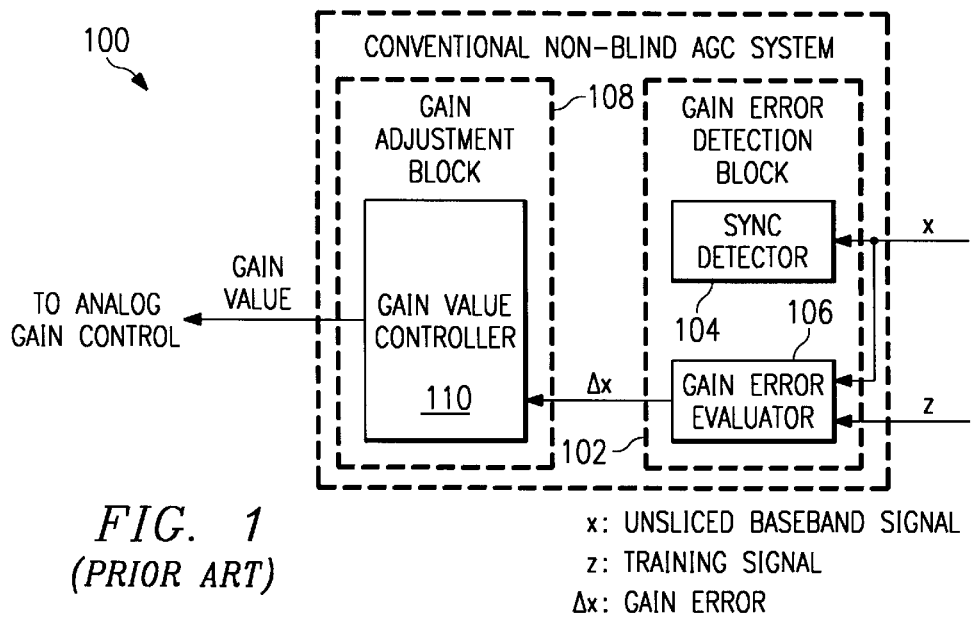
FIG. 1 is a block diagram of a prior art automatic gain control (AGC) system.
Figure 2A:
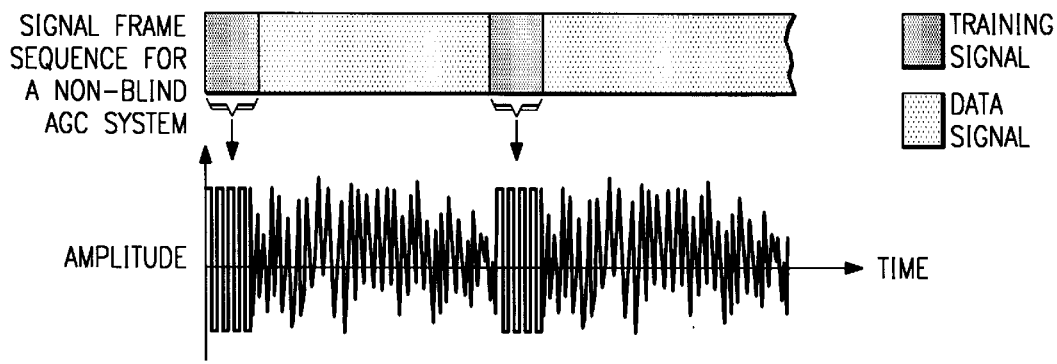
FIGS. 2(A) and 2(B) illustrate exemplary signal frame sequences for a non-blind AGC system and for a blind AGC system, respectively.
Figure 2B:
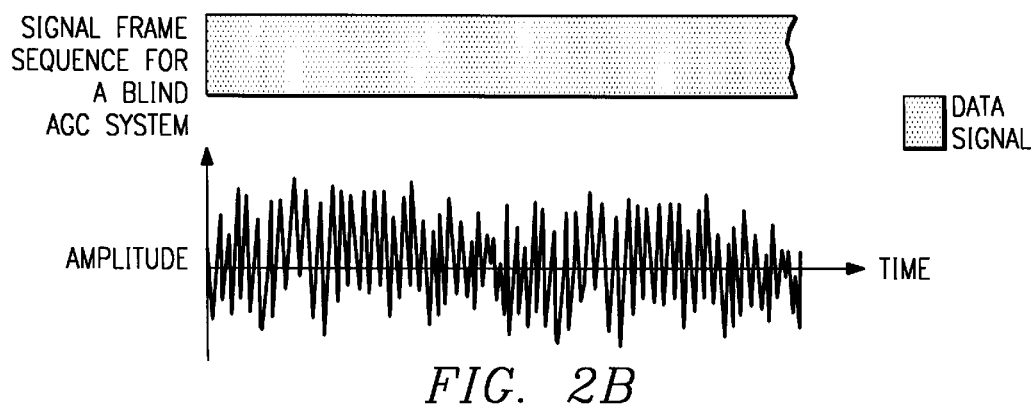
Figure 3:
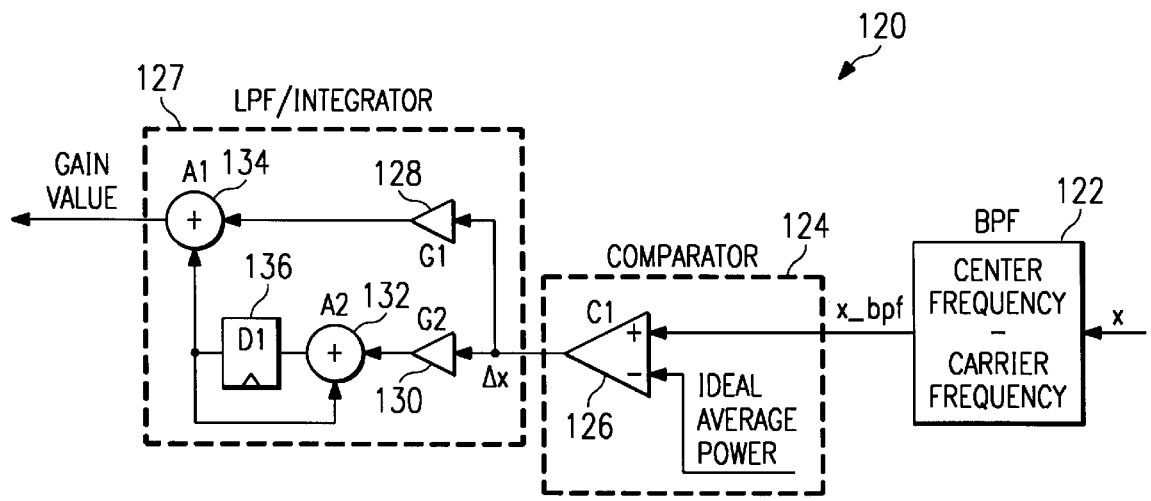
FIG. 3 depicts a block diagram for a prior art blind AGC system.
Figure 4:
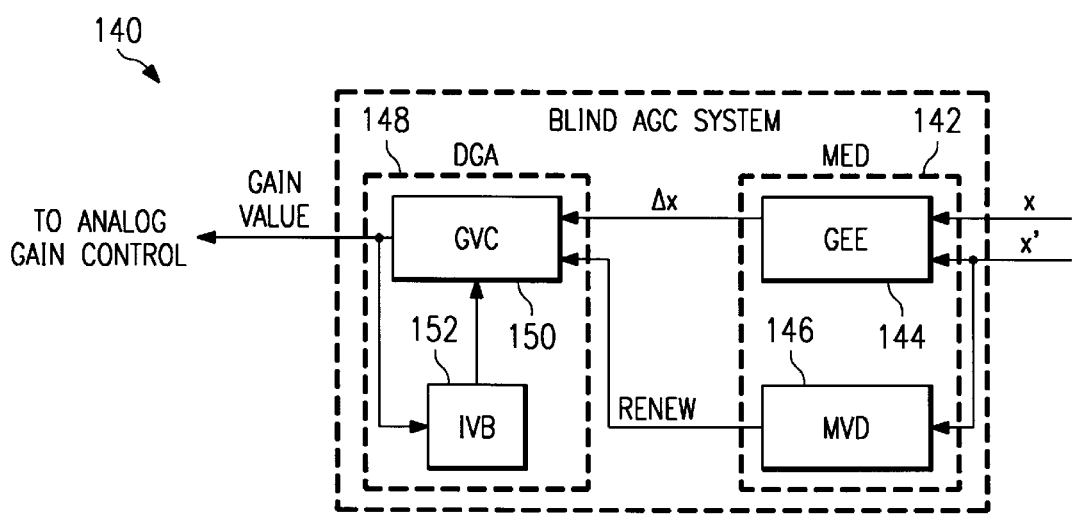
FIG. 4 is a block diagram of a preferred embodiment of a blind AGC system in accordance with the present invention.

The preferred embodiment of the present invention as shown in FIG. 4 shows an AGC system 140 which includes a maximum error detector (MED) 142, and a gain value adjuster (DGA) 148. The MED 142 includes a maximum value detector (MVD) 146, and a gain error evaluator (GEE) 144. The DGA 148 includes a initial value buffer (IVB) 152, and a gain value controller (GVC) 150.

Operation of the preferred embodiment of the present invention as shown in FIG. 4 is expressed generally by the following algorithm (using C language):

IVB=$\alpha_0$; /* insert a very large initial gain value in IVB */
read(x);
x_output=$\alpha$*x; /* calculate output */

/***** Maximum Error Detection *****/

10: x'=sliced(x_output);
$\Delta$x=x_output−x'
if (x'==|x_max|) renew=HIGH;
else renew=LOW;

/***** Decision Gain Adjustment *****/

$\alpha$=IVB;
if (renew==HIGH) adjust $\alpha$ by hard clamping and insert $\alpha$ in IVB;
else adjust $\alpha$ by soft clamping and insert $\alpha$ in IVB;
read(x);
x_output=$\alpha$*x; /* calculate output */
goto 10;

The algorithm is also generally expressed by the following steps:

(1) Detect maximum or minimum (i.e., maximum absolute) values of the demodulated baseband signals.
(2) Evaluate the gain error.
(3) Control output gain value to compensate for the gain error.
(4) Renew the output gain value if any changes occur in the gain error.
(5) Distinguish burst noises from a genuine gain error change.

The algorithm has two parts: (a) a decision gain adjustment (DGA) part and (b) a maximum error detection (MED) part. A fundamental principle of this algorithm is to amplify the input x initially by a large gain value, and then to reduce this gain value so that $\Delta$x, the gain error, approaches a minimal value $\Delta$t which is close to zero. Steps (1) and (4) in the algorithm shown hereinabove illustrate the functionality of the DGA module 148. Steps (2) and (3) illustrate the operation of the MVD module 146. The operation shown in step (5) is implemented using loop filters and is explained in further detail hereinbelow.

Operation of the above algorithm assumes the following three conditions:

(1) The probability distribution for all demodulated signal values must be fairly even. This is achieved by randomizing the input signal using a scrambler in the transmitter.
(2) Abrupt changes in the gain error occur generally because of burst noises.
(3)

$$\alpha_0 >= \alpha\_ideal \qquad \text{Eq. (1)}$$

where $\alpha\_ideal$ is the ideal gain value and $\alpha_0$ is initial gain value. This is implemented by inserting a very high initial gain value $\alpha_0$ (e.g., above 10) into an initial value buffer (IVB).

Returning to FIG. 4, the MED 142 detects gain error in unsliced baseband signal x and also detects occurrence of a predefined maximum value in sliced baseband signal x'. The sliced baseband signal x' is the signal output from a slicer (or predictor), not shown, which is an estimate of the symbol most likely transmitted by the distorted input baseband signal x. The GEE 144 generates error signal $\Delta$x in accordance with the following equation.

$$\Delta x = x - x' \qquad \text{Eq.(2)}$$

The MVD 146 detects the occurrence of the maximum value of the sliced baseband signal x' by comparing the sliced baseband signal x' with a predetermined value. When the MVD 146 detects the maximum value of the sliced baseband signal x', a renew signal is set high. The GEE 144 is operable to evaluate the gain error, $\Delta$x, for the sliced baseband signal x'. For simplicity, the MVD 146 is implemented to detect either the maximum or the minimum value (as illustrated mathematically by Eq (3) hereinbelow).

$$renew = \begin{cases} HIGH & (if\ x' = |x\_max|) \\ LOW & (otherwise) \end{cases} \qquad \text{Eq. (3)}$$

The DGA 148 adjusts the output gain value signal in accordance with the error signal $\Delta$x and the renew signal. This is done by the actions of the IVB 152 and the GVC 150 in the DGA 148. The IVB 152 is initialized with an initial gain value $\alpha_0$. The initial gain value $\alpha_0$ is used by the GVC 150 to amplify the output gain value signal so that $\alpha_0 \cdot x >= |x\_max|$ where $|x\_max|$ is the absolute value of the maximum or minimum possible (amplitude) value for the input baseband signal x.

The value of $|x\_max|$ is predetermined and dependent upon the type of modulation technique used. For example, for 64 QAM (Quadrature Amplitude Modulation) having a non-hierarchical constellation, $|x\_max|$ is set to a value of 7. Use of a high initial gain value $\alpha_0$ not only simplifies the algorithm and the architectural design, but also significantly reduces the computational cost.

The GVC 150 also includes a loop filter which smoothes abrupt changes in the value of the error signal $\Delta$x and generates the output gain value signal that compensates for the error signal $\Delta$x.

Figure 5:
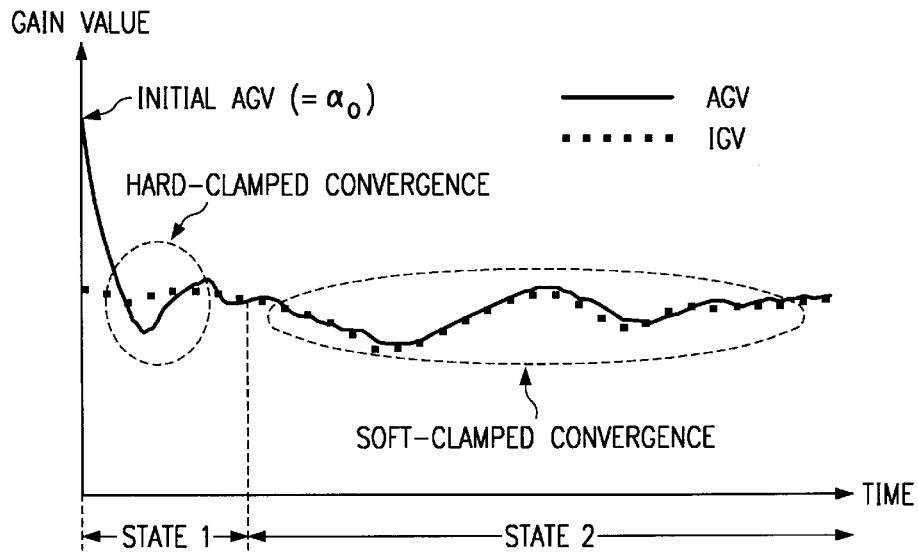
FIG. 5 shows a graph illustrating convergence of output gain value over time when using a blind AGC system in accordance with the present invention.
Figure 6A:
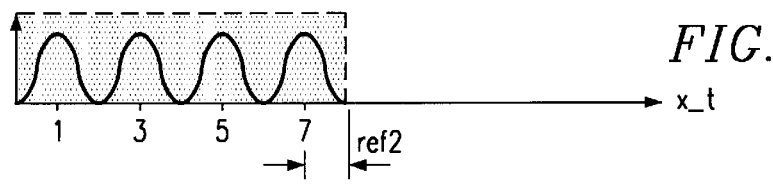
FIG. 6 shows exemplary graphs of signal amplitudes which illustrate operation of a blind AGC system in accordance with the present invention.
Figure 6B:
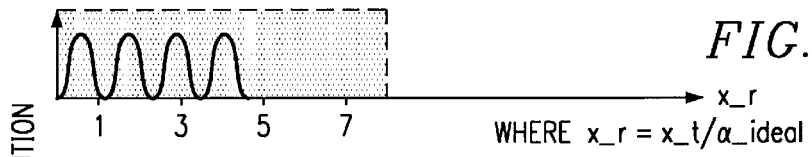
Figure 6C:
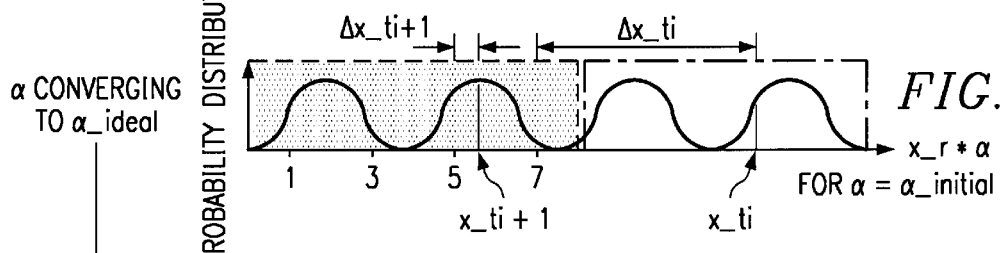
Figure 6D:
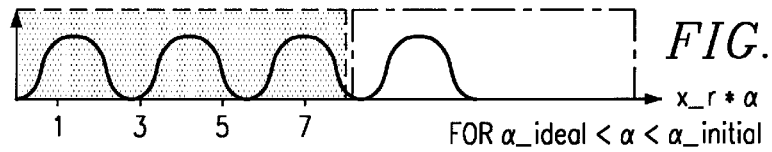
Figure 6E:
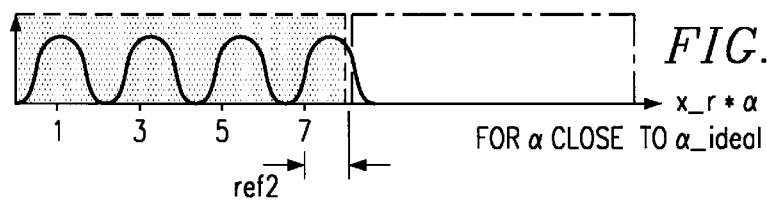

As an example, suppose the ideal gain value (IGV) for a communication system changes with time, as shown in FIG. 5. An actual gain value (AGV) that is very close to the IGV is desired. Thus, an initial value $\alpha_0$ that is much greater than the IGV is stored in the IVB 152 shown in FIG. 4. Since the initial value $\alpha_0$ stored in the IVB 152 is much greater than the IGV, as shown in Eq. (1), the gain error, $\Delta$x, is large. According to the algorithm discussed hereinabove, the actual value AGV can be reduced close to this ideal value IGV. This type of convergence is called hard clamping, illustrated as State 1 in FIG. 5. Because very high gain values have undesirable effects on the functions of other parts of the communications device, the time required for this type of convergence must be as small as possible.

The algorithm described hereinabove, however, only reduces the output gain value when the gain error signal Δx is both positive and large. Once the AGV is reduced to close to the IGV, the value of the gain error signal Δx approaches a threshold value Δt. So, for small values of the gain error signal Δx of both positive and negative signs, the output gain value must be changed (i.e., not only reduced but also increased) gently in accordance with the value of the gain error signal Δx. This type of convergence is called soft clamping, illustrated as State 2 in FIG. 5. To implement this function, one embodiment of the present invention uses a loop filter that acts as an integrator or low pass filter. In addition, the AGV must be renewed for all values of the sliced baseband signal x'.

As a result, there are two states for the convergence of the AGV in the GVC 150 in accordance with the present invention.

In the first state (the initial state), State 1 in FIG. 5, when the gain error signal Δx is large and positive (i.e., when Δx>Δt, where Δt>0) and when the sliced baseband signal x' is equal to its maximum possible amplitude (i.e., when x'=x_max), the AGV is converged to the IGV by hard clamping.

In the second state, State 2 in FIG. 5, for small values of the gain error signal Δx both positive and negative (i.e., |Δx|<Δt) and for values of the sliced baseband signal x' less than the maximum possible amplitude (i.e., when x'<=x_max), the AGV is converged to the IGV using soft clamping.

The probability distributions shown in FIG. 6 serve to further illustrate operation of the present invention. FIG. 6(*a*) shows a graph illustrating the amplitude of baseband signal x_t in the transmitter. FIG. 6(*b*) illustrates channel attenuated amplitude signal x_r in the receiver where $$x\_r = \frac{x\_t}{\alpha\_ideal}.$$

FIGS. 6(*c*), 6(*d*), and 6(*e*) depict probability distribution functions of x_r*α for α=α_ideal, for α_ideal<α<α_ideal, and for α close to α_ideal, respectively as a is converged to α_ideal. The function of any AGC is to make the distribution of x_r into the distribution of x_t. Thus, FIG. 6(*d*) shows that more weight is applied to gain error Δx (e.g., Δx_ti) of these amplitudes as long as α needs to be reduced and the maximum amplitude is detected. Similarly, FIG. 6(*e*) shows that less weight is placed on the gain error Δx (e.g., Δx_t$_{i+1}$) of these amplitudes since the maximum amplitude is not detected. This is accomplished by thresholding the weight of the gain error Δx in GVC A 178 or GVC B 180 as shown in FIG. 8 and discussed in more detail hereinbelow.

Figure 7:
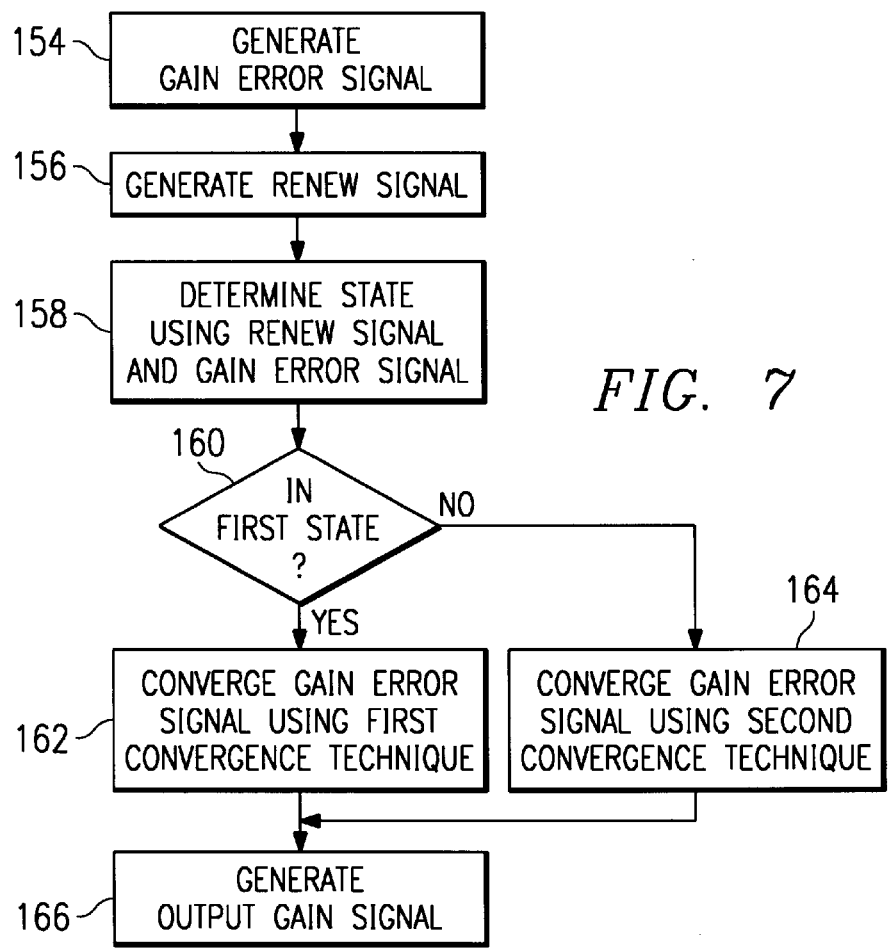
FIG. 7 is a flow diagram illustrating operation of a blind AGC system in accordance with the present invention.

The flow diagram in FIG. 7 illustrates general operation of the present invention. At block 154, the gain error signal, Δx is generated. At block 156, the renew signal, renew, is generated. The current state of operation is then determined at block 158 in accordance with the generated renew signal and the gain error signals. If in the first state of operation, as determined at decision block 160, then at block 162 the gain error signal is converged using a first convergence technique, e.g., hard clamping. If not in the first state of operation, then at block 164 the gain error signal is converged using a second convergence technique, e.g., soft clamping. Finally, the resultant output gain error signal is generated at block 166.

Figure 8:
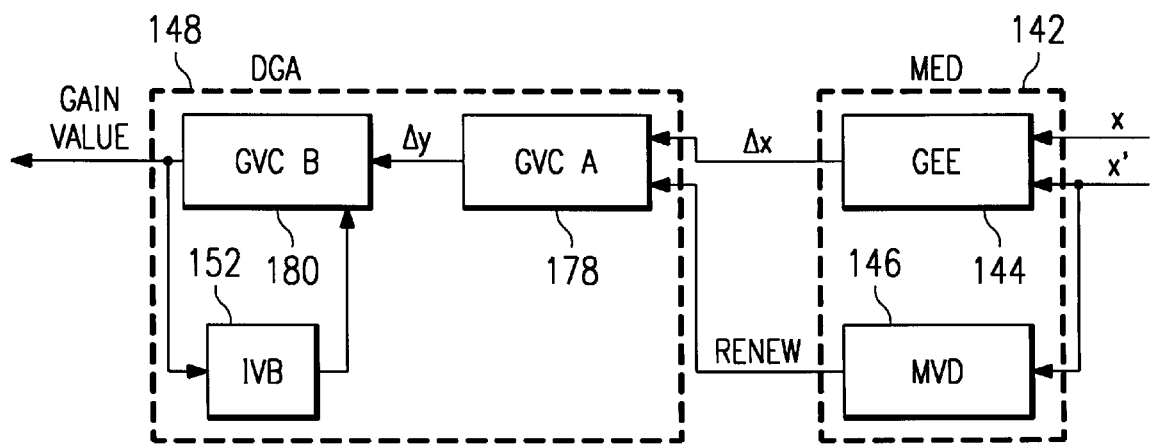
FIG. 8 illustrates a block diagram of a second embodiment of a blind AGC system in accordance with the present invention.

To implement the two states of convergence, the GVC 150 shown in FIG. 4 is divided into two functional modules, as shown in FIG. 8, GVC A 178 and GVC B 180.

Figure 9:
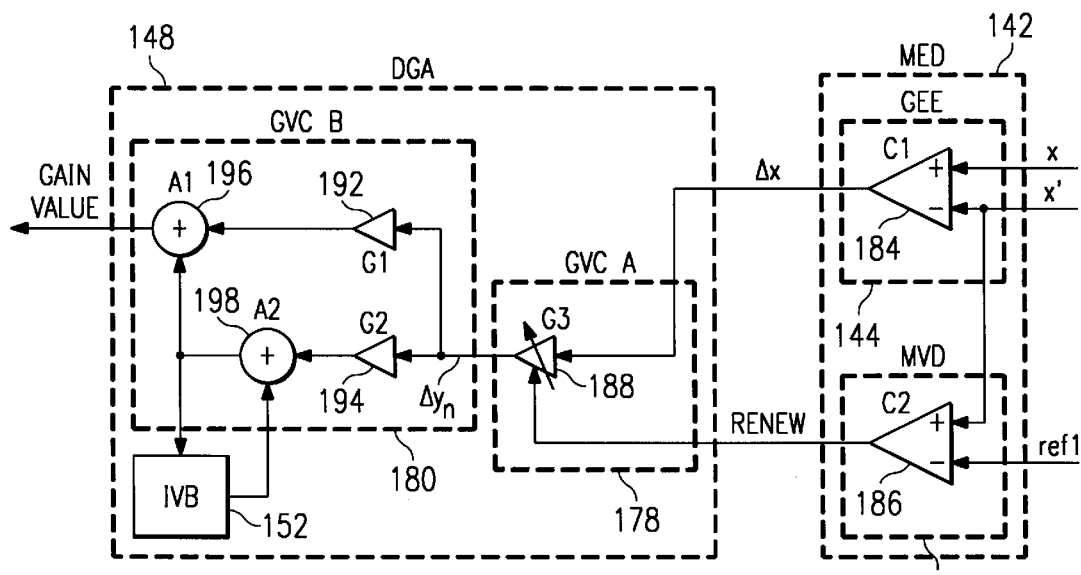
FIGS. 9–12 show more detailed block diagrams of the blind AGC system shown in FIG. 8.

GVC A 178 enables fast hard-clamped convergence when the system is in the first state. To implement the hard-clamped convergence function, the GVC A 178 is operable in the first state to amplify the gain error signal Δx by a pre-determined factor k using a variable gain G3 188, as illustrated in the detailed block diagram shown in FIG. 9. The operation of the GVC A 178 is expressed mathematically in Eq. (4) hereinbelow. The variable gain G3 188 in FIG. 9 is set to its highest value when the renew signal is HIGH and vice versa.

$$G3 = \begin{cases} \text{A high value (if renew is HIGH)} \\ \text{A low value (if renew is LOW)} \end{cases} \quad \text{Eq. (4)}$$

GVC B 180 enables soft-clamped convergence of the AGV to the IGV when the system is in the second state. The GBV B 180 operates by smoothing abrupt changes in the gain error signal Δx which may be caused by burst noises. For this purpose, a loop filter is used in the GVC B 180, which includes an integration (or a low pass filter) circuit coupled with the IVB 152 as shown in FIG. 9. The integration circuit shown in the GVC B 180 in FIG. 9 includes fixed gains G1 192 and G2 194, and adders A1 196 and A2 198. The operation of the GVC B 180 is expressed mathematically in Eq. (5) hereinbelow where AGV$_n$ is the nth output gain value and Δy$_n$ is nth input into the GVC B 180 from the GVC A 178.

$$AGV_n = G1 \cdot \Delta y_n + G2 \sum_{i=0}^{n} \Delta y_i + \alpha_0 \quad \text{Eq. (5)}$$

In the detailed block diagram shown in FIG. 9, comparator C1 184 and comparator C2 186 correspond to the GEE 144 and the MVD 146, respectively, as shown in the MED 142 in FIG. 8. The value of the signal ref1, which is input into the comparator C2 186, is equal to x_max. The variable gain G3 188 corresponds to the GVC A 178 shown in FIG. 8.

In FIG. 9, the gains G1 192 and G2 194 and the adders A1 196 and A2 198 correspond to the loop filter of the GVC B 180. The initial value α$_0$ in the IVB 152 is output immediately at first. It is then renewed gradually as the gain error signal Δx is fed into the loop filter of the GVC B 180. The GVC A 178 and the GVC B 180 thus provide fast convergence when the system is in the first state.

Operation of the GVC A 178 and the GVC B 180 are expressed mathematically in Eq. (6) and Eq. (7), respectively, hereinbelow where the signal Δy$_n$ is the n$^{th}$ input from the GVC A 178 to the GVC B 180. Eq. (7) is obtained by substituting Eq. (6) into Eq. (5). The operation of GVC A 178 and GVC B 180 provide fast convergence when the system is in the first state.

$$\Delta y_n = G3 \cdot \Delta x_n \quad \text{Eq. (6)}$$

$$AGV_n = G1 \cdot G3 \cdot \Delta x_n + G2 \cdot G3 \cdot \sum_{i=0}^{n} \Delta x_i + \alpha_0 \quad \text{Eq. (7)}$$

Figure 10:
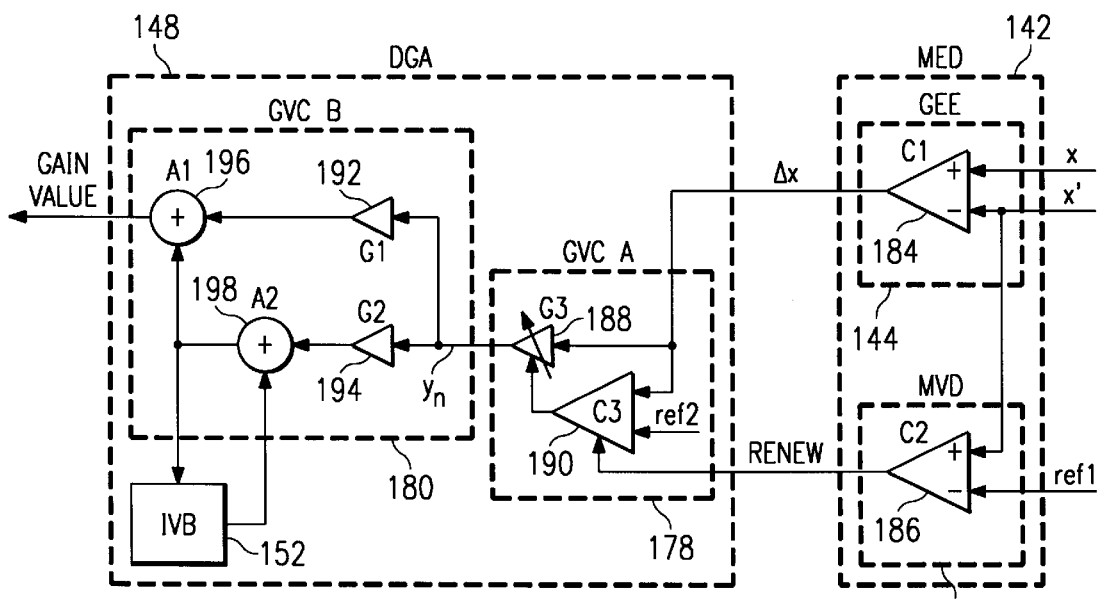

In FIG. 10 a comparator C3 190 is added to the diagram shown in FIG. 9. The comparator C3 190 is enabled when the renew signal from the comparator C2 186 is set HIGH. The signal ref2 (i.e., Δt) is the threshold value for the gain error signal Δx. The variable gain G3 188 is highest when both the gain error signal Δx is greater than the signal ref2 and the renew signal is HIGH. Thus, the use of the signal ref2 enables faster convergence of the output gain value under certain circumstances. Eq. (8) illustrates the variable gain value of the variable gain G3 188 for different input values of the renew signal, where k is the high value, and γ is the low value for the variable gain G3 188 as discussed hereinabove in reference to Eq. (4).

$$G3 = \begin{cases} k & \text{if renew is HIGH and } \Delta x > \Delta t \\ \eta_o & \text{otherwise} \end{cases} \quad \text{Eq. (8)}$$

The equations for $\Delta y_n$ and $AGV_n$ remain the same as shown in Eq. (6) and Eq. (7), respectively.

Figure 11:
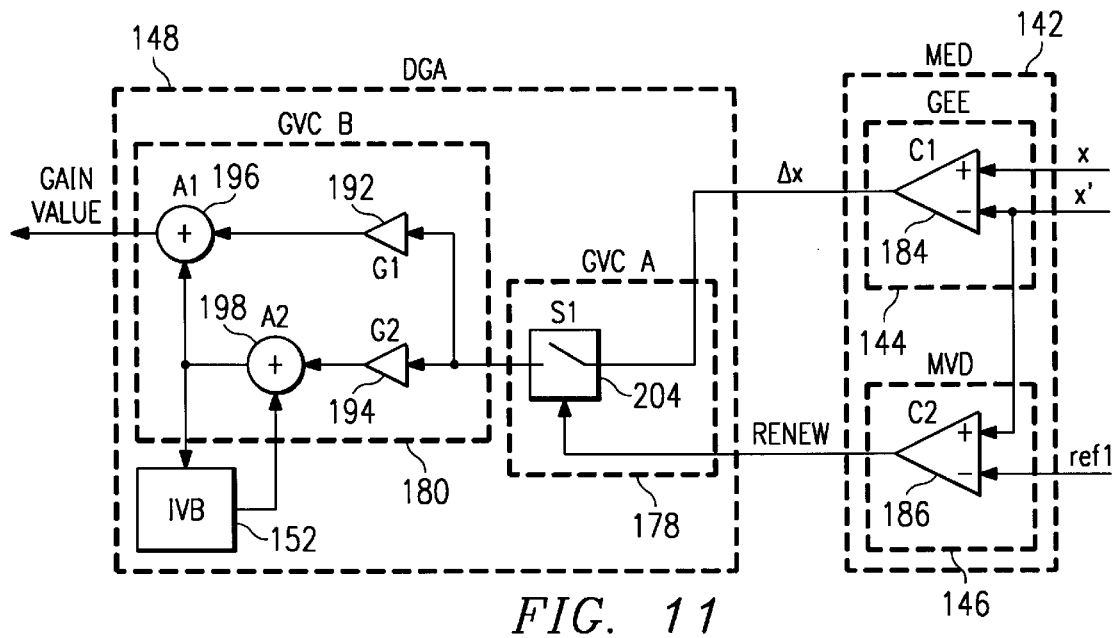

FIG. 11 shows another detailed block diagram of the present invention. In FIG. 11, the switch S1 204 implements the GVC A 178. The system illustrated in FIG. 11 functions similar to the one shown in FIG. 9 except that the output gain value converges more slowly. Since the variable gain G3 188 shown in FIG. 9 is replaced in FIG. 11 with the switch S1 204, Eq. (6), the equation for the GVC A 178, becomes Eq. (9). As a result, Eq. (10), the resulting equation for the operation of the GVC B 180, is obtained by substituting Eq. (9) into Eq. (5). The switch S1 204 is ON, when the renew signal is HIGH and vice versa. In Eq. (10), Eq. (11) and Eq. (12), the value $\alpha_{n-1}$ is the output gain value previously stored in the IVB 152 and the switch S1' represents the previous value of the switch S1 204. Although slower to converge in the first state, this embodiment of the present invention is more stable to burst noises in the second state.

$$\Delta y_n = S1 \cdot \Delta x_n \quad \text{Eq. (9)}$$

$$AGV_n = G1 \cdot S1 \cdot \Delta x_n + G2 \cdot S1 \cdot \Delta x_n + \alpha_{n-1} \quad \text{Eq. (10)}$$

$$S1 = \begin{cases} 1 & \text{(if renew is HIGH)} \\ 0 & \text{(if renew if LOW)} \end{cases} \quad \text{Eq. (11)}$$

$$\alpha_{n-1} = G2 \cdot S1' \cdot \Delta x_n + \alpha_{n-2} \quad \text{Eq. (12)}$$

Figure 12:
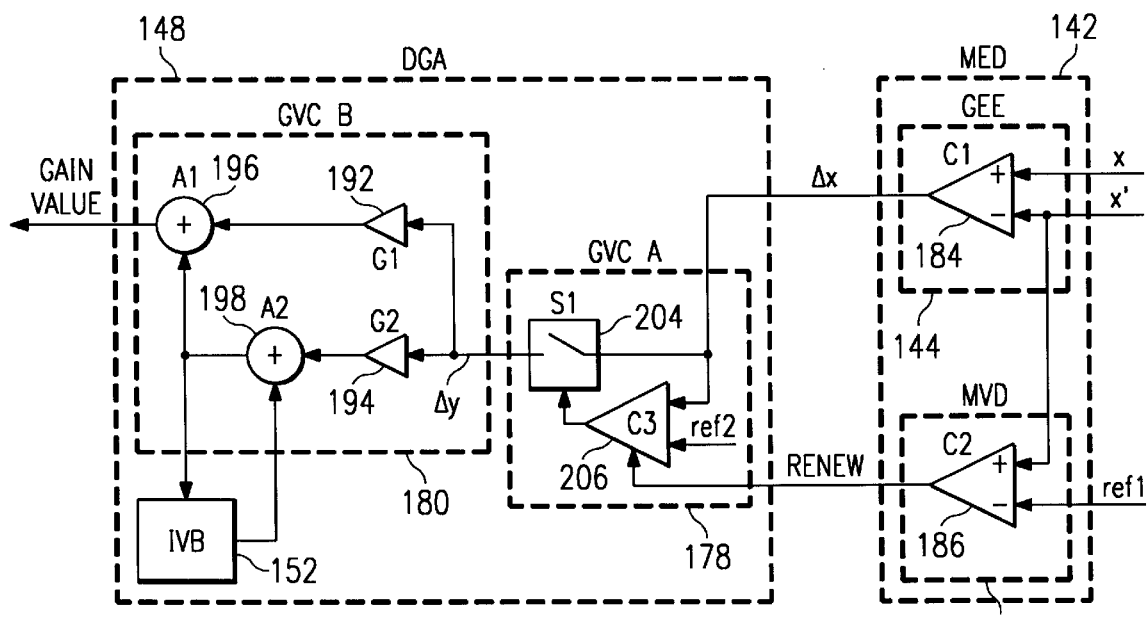

Similar to FIG. 11, a comparator C3 206 is added in FIG. 12. The comparator C3 206 in FIG. 12 has the same function as the comparator C3 190 shown in FIG. 10. As a result, Eq. (11), which mathematically describes the operation of the switch S1 204, changes to Eq. (13).

$$S1 = \begin{cases} 1 & \text{(if renew is HIGH and } \Delta x_n > \Delta t) \\ 0 & \text{(otherwise)} \end{cases} \quad \text{Eq. (13)}$$

Figure 13:
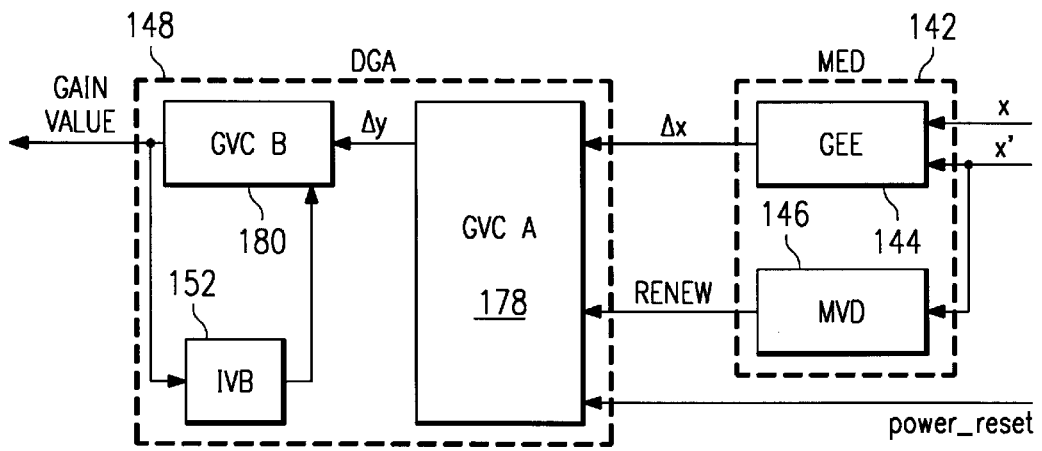
FIG. 13 depicts a detailed block diagram of a third embodiment of a blind AGC system in accordance with the present invention.

The embodiment of the present invention shown in FIG. 13, includes a power_reset signal input into the GVC A 178, is more stable to burst noises and at the same time is faster in convergence than the previous embodiments. Detailed block diagrams of FIG. 13 are shown in FIGS. 14–17 and operates similar to the systems shown in FIGS. 9–12 except that in the AGC systems shown in FIGS. 14–17, a counter 222 is included in the GVC A 178. The counter 222 is incremented (set) in accordance with the power_reset signal. The output of the counter 222 is input to an inverter 220. The output of the inverter 220 and the renew signal are then provided as input to AND gate 208.

The systems shown in FIGS. 14–17 provide non-sensitivity to burst noises of any length by filtering out the burst noises from the high value of the gain error signal Δx when the burst noises occur. In general, the gain error signal Δx is also high when the AGC system of the present invention is hard-clamping. Thus the embodiments of the present invention shown in FIGS. 14–17 set a flag to indicate whether or not the AGC system is in the first state or in the second state (i.e., whether or not the AGC system is hard-clamping or soft-clamping). If the flag indicates that the system is in the first state (i.e., is hard-clamping) then no attempt is made to filter out the burst noises. This flag is implemented by the counter 222 which is turned on (set) after a time $t_1$ from the time at which the power_reset signal turns on. The time $t_1$ is the estimated time required for convergence. In the GVC A 178 shown in FIGS. 14–17, if the renew signal is HIGH and if the gain error signal Δx is greater than the ref2 signal and if the inverse of the signal from the ti counter 222 is ON, then the variable gain G3 188 equals the gain error signal Δx minus the ref2 signal. Otherwise, the variable gain G3 188 is a small value between −1 and +1.

The value chosen for the time $t_1$ is dependent upon the gain value parameters of the gain G1 192, the gain G2 194 and the variable gain G3 188. Optimum values of these parameters are obtained when the convergence is critically dampened, which in turn depends upon the Signal To Noise Ratio (SNR) of the channel. The expected SNR is dependent upon the type of channel used. For example, a terrestrial channel has a relatively low SNR, a co-axial cable channel has a relatively higher SNR, and a fiber optic cable has an even higher SNR relative to the terrestrial channel and the co-axial cable. The lower the SNR, the smaller the values chosen for the gain G1 192, the gain G2 194 and the variable gain G3 188 must be. As a result, the value chosen for the time $t_1$ is larger. In general, a large $t_1$ (about 500,000 clocks for 64 QAM or 8 VSB) will be sufficient for any type of channel.

Figure 14:
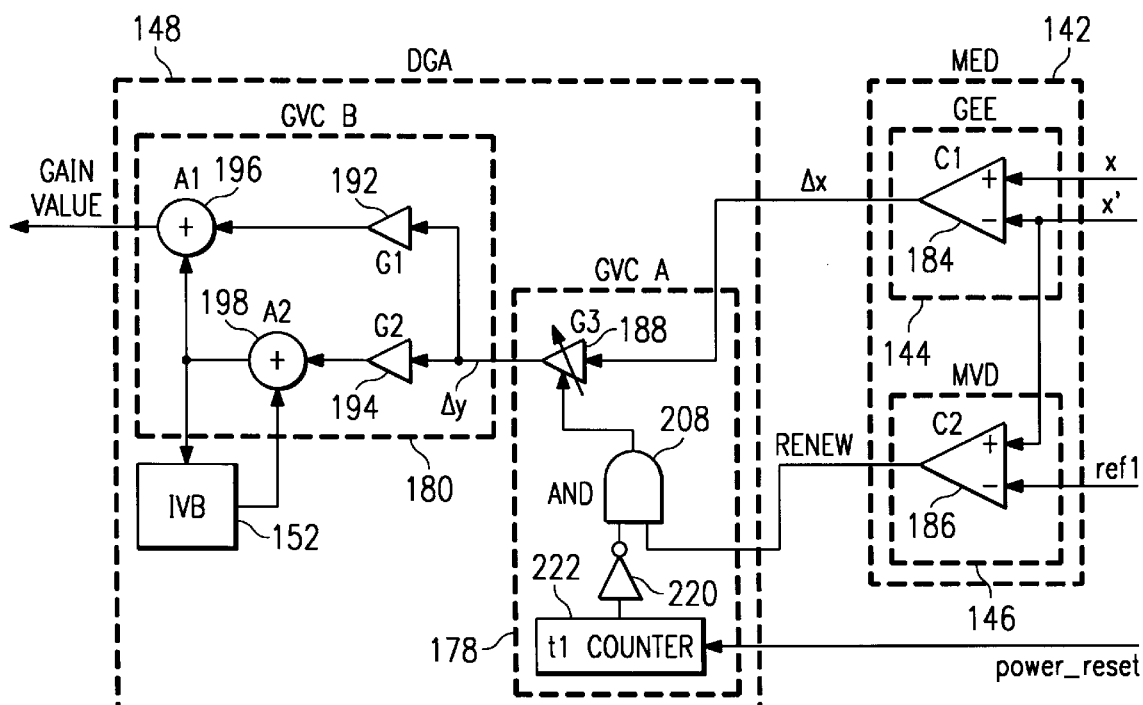
FIGS. 14–17 show more detailed block diagrams of the blind AGC system shown in FIG. 13.
Figure 15:
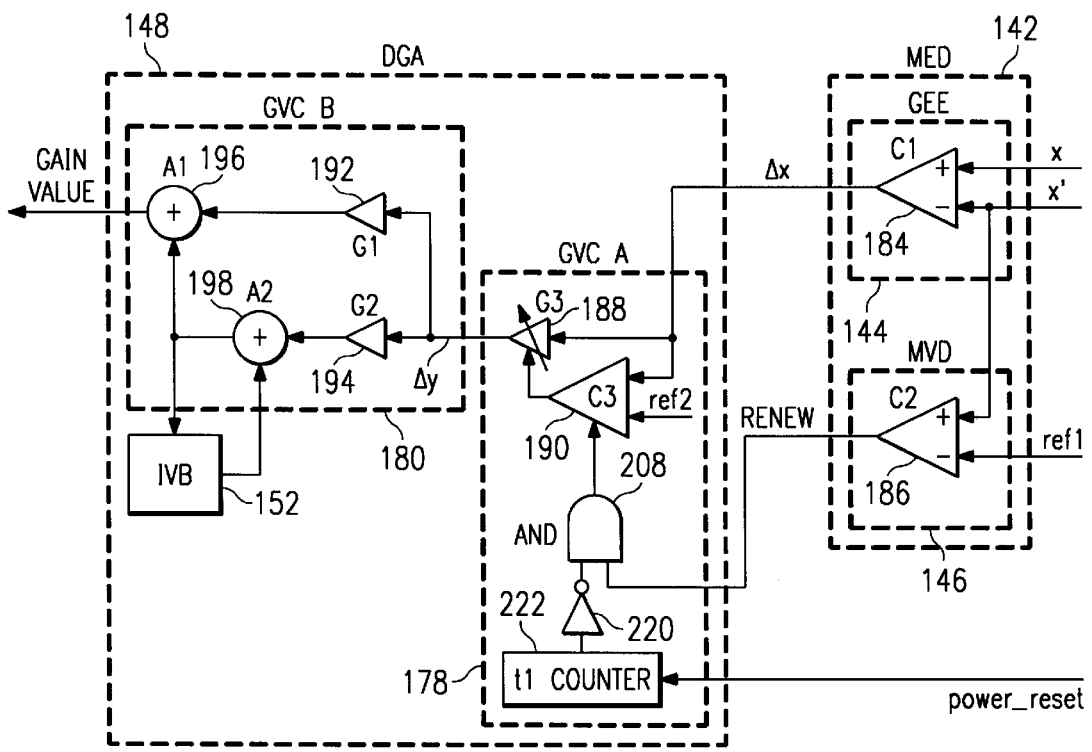

In FIG. 15, a comparator C3 190, which has signal ref2 as input, is added to the GVC A 178 shown in FIG. 14. The comparator C3 190 shown in FIG. 15 functions similarly to the one shown in FIG. 10.

Figure 16:
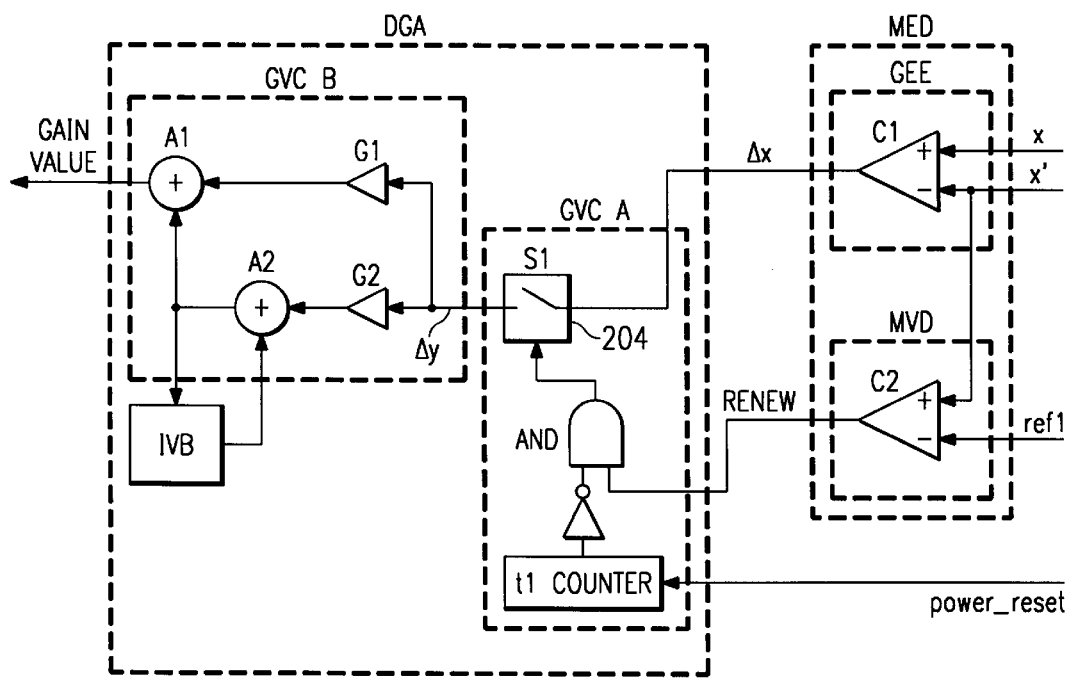

In FIG. 16, a switch S1 204 is substituted for the variable gain G3 188 in the GVC A 178 shown in FIG. 14. The switch S1 204 functions similarly to the one shown in FIG. 11.

Figure 17:
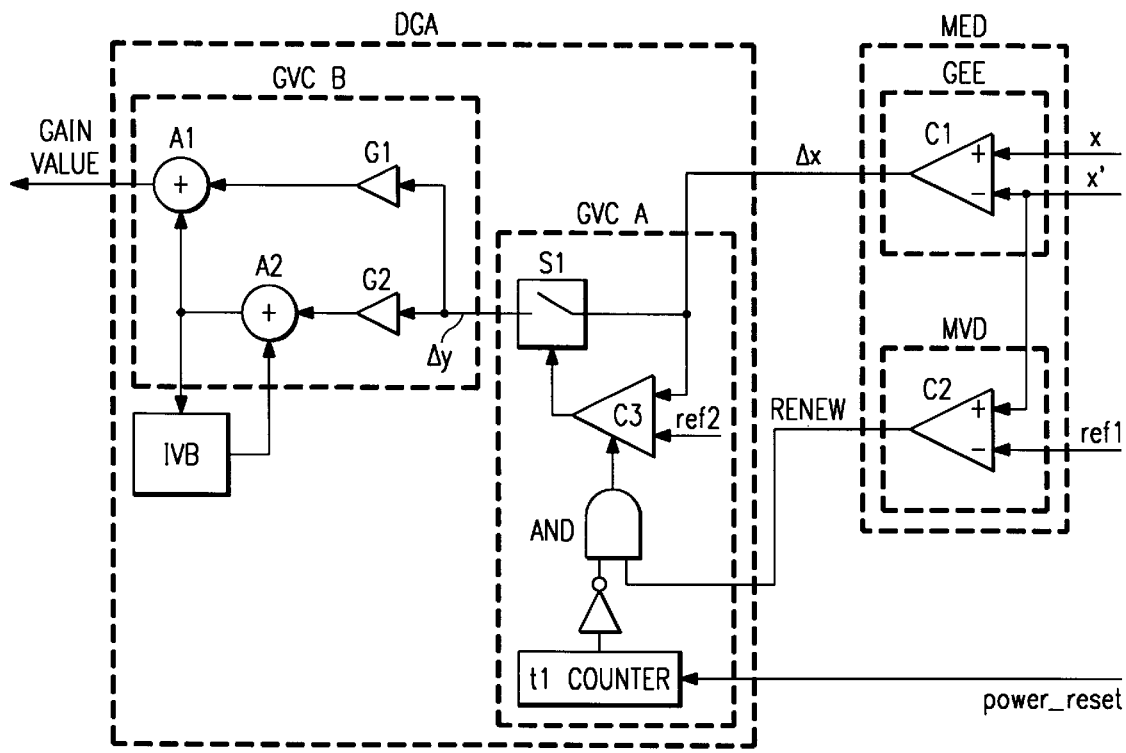

In FIG. 17, a comparator C3 190, which has signal ref2 as input, is added to the GVC A 178 shown in FIG. 16. The comparator C3 190 shown in FIG. 17 functions similarly to the one shown in FIG. 10.

FIGS. 18–27 shown embodiments of the present invention in which the thresholding mechanism applied to the gain error signal Δx is implemented in the GVC B 180 instead of in the GVC A 178 as shown in the previous embodiments. For this purpose, a signal renew2 is used between the GVC A 178 and the GVC B 180, the gain error signal Δx is passed to the GVC B 180, and the variable gain G3 shown in FIGS. 9–10 and in FIGS. 14–15 is fused to either the variable gain G1 or to both the variable gains G1 and G2 of the loop filter in the GVC B 180. FIGS. 19–20 and FIGS. 24–25 show detailed block diagrams where G3 is fused to both G1 and G2. Mathematical equations describing the operation of the gains G1 and G2 are given in Eq. (14) and Eq. (15), respectively, where G1', G2', and G3' are the values for the gains G1, G2, and G3, respectively, as shown in FIGS. 9–10 and FIGS. 14–15.

$$G1 = G1' * G3' \quad \text{Eq. (14)}$$

$$G2 = G2' * G3' \quad \text{Eq. (15)}$$

FIGS. 21–22 and FIGS. 26–27 show detailed block diagrams where the variable gain G3 is fused to only G1 as described mathematically in Eq. (14).

The computation of $AGV_n$ is the same as shown in Eq. (5), except that $\Delta y_n$ is equal to $\Delta x_n$ as illustrated mathematically in Eq. (16).

$$AGV_n = G1 \cdot S1 \cdot \Delta x_n + G2 \cdot \sum_{i=0}^{n} \Delta x_i + a_0 \qquad \text{Eq. (16)}$$

Figure 20:
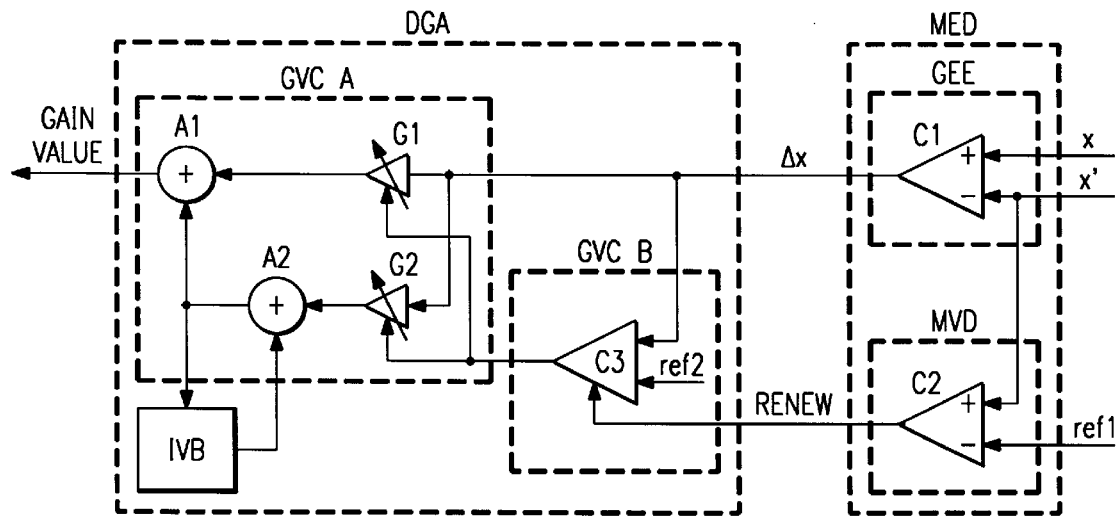
Figure 21:
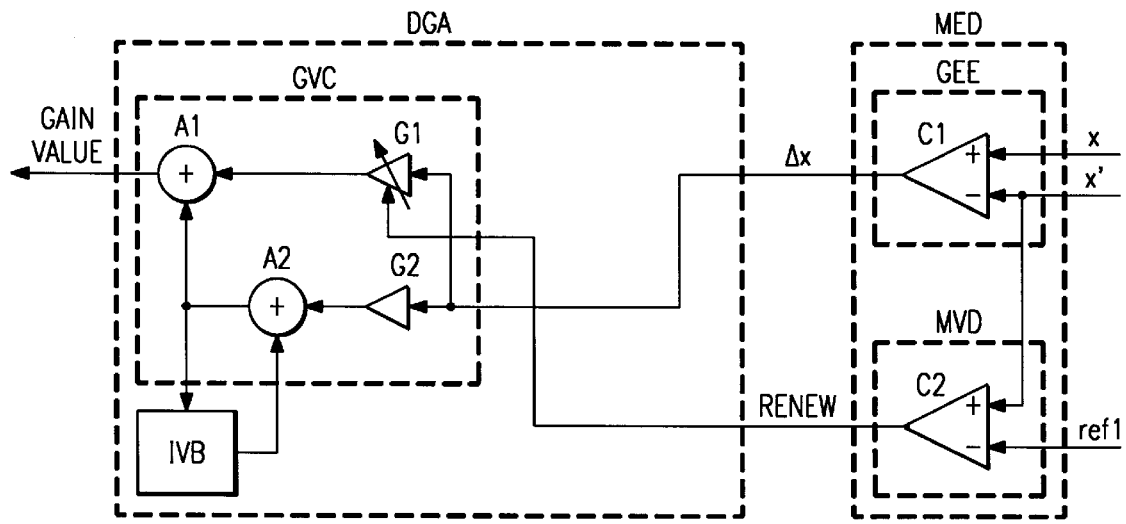
Figure 22:
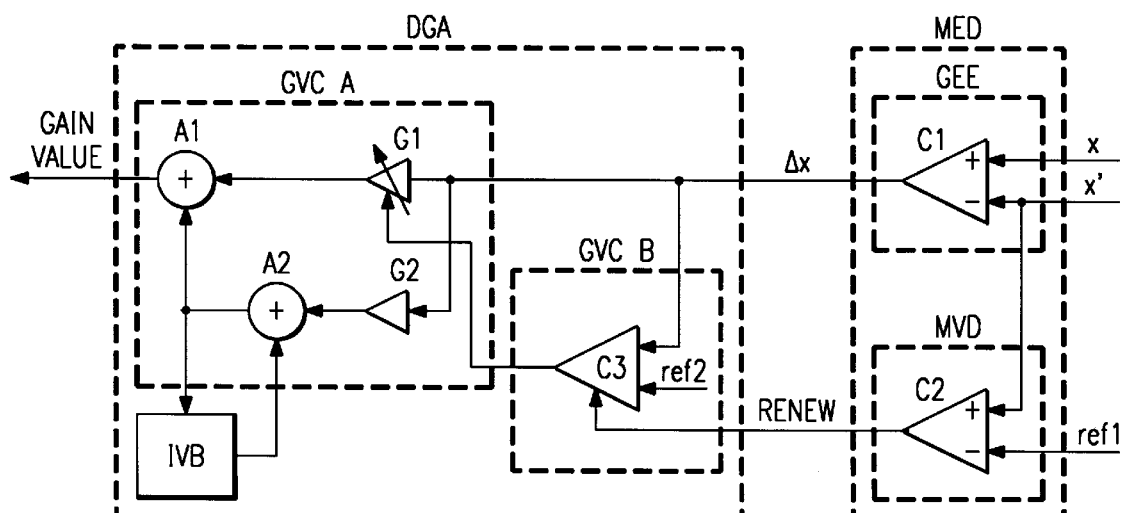

Since the variable gain G3 shown in FIG. 10 is fused either to both the gains G1 and G2, as shown in FIG. 20, or to only the gain G1, as shown in FIG. 22, the GVC A 178 becomes empty and the hard clamping mechanism is implemented entirely in the GVC B 180. In this case, the GVC is considered as a single module.

The various embodiments of the present invention as implemented in the block diagrams shown in FIGS. 8–27 can be summarized as follows.

The embodiments shown in FIGS. 19–20 and 23–24, where G3 188 is fused to both G1 192 and G2 194 behave similarly to the previous embodiments shown in FIGS. 9–12 and 14–17. However, the embodiments shown in FIGS. 21–22 and 25–26, where the variable gain G3 188 is fused to only G1 192, provide further stability towards burst noise. This is because as G2 194 has a fixed gain value (relatively smaller than that of G1 192 during hard clamping), the 152 IVB is less influenced by burst noise. As the IVB 152 is less influenced, it helps the output gain value to recover quickly from the effect of burst noise.

FIG. 8 illustrates the basic implementation in which the thresholding mechanism is separate from the loop filtering mechanism and the power_reset signal is not used. FIGS. 9–12 are variations of FIG. 8 where FIGS. 9–10 include variable gain G3 188 and FIGS. 11–12 include switch S1 204. In addition, FIGS. 9 and 11 do not include comparator C3 190 but FIGS. 10 and 12 do include comparator C3 190.

FIG. 13 illustrates the basic implementation in which the thresholding mechanism is separate from the loop filtering mechanism and the power_reset signal is used. FIGS. 14–17 are variations of FIG. 14 where FIGS. 14–15 include variable gain G3 188 and FIGS. 16–17 include switch S1 204. In addition, FIGS. 14 and 16 do not include comparator C3 190 but FIGS. 15 and 17 do include comparator C3 190.

Figure 18:
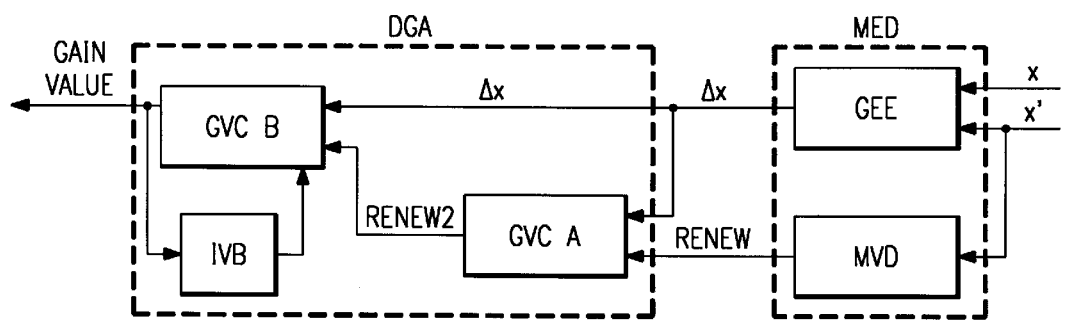
FIG. 18 illustrates a block diagram of a fourth embodiment of the blind AGC system in accordance with the present invention.
Figure 19:
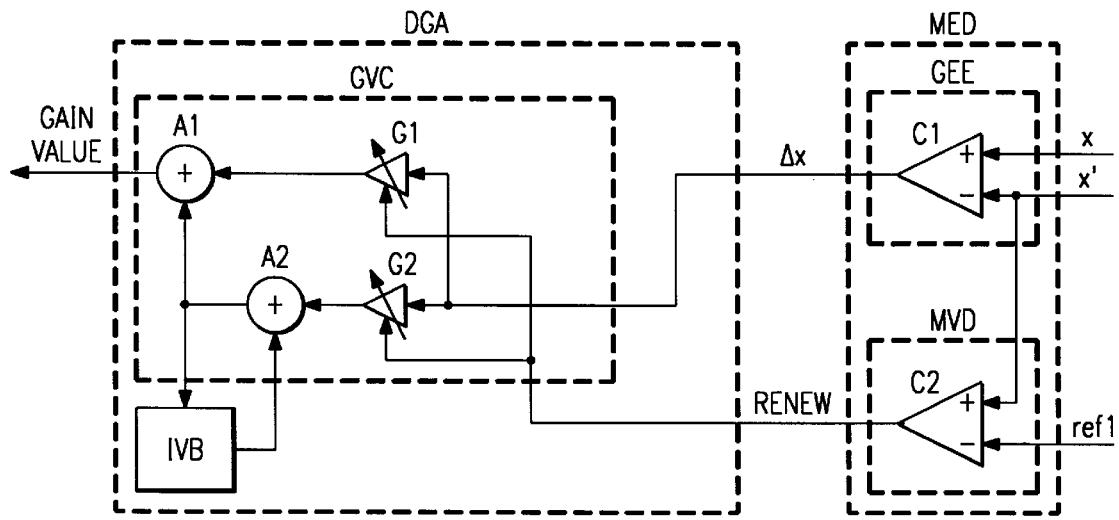
FIGS. 19–22 show more detailed block diagrams of the blind AGC system shown in FIG. 18.

FIG. 18 illustrates the basic implementation in which the thresholding mechanism is built into the loop filtering mechanism and the power_reset signal is not used. FIGS. 19–22 are variations of FIG. 18 where FIGS. 19–20 include both gain G1 192 and gain G2 194 and FIGS. 21–22 include only gain G1 192. In addition, FIGS. 19 and 21 do not include comparator C3 190 but FIGS. 20 and 22 do include comparator C3 190.

Figure 23:
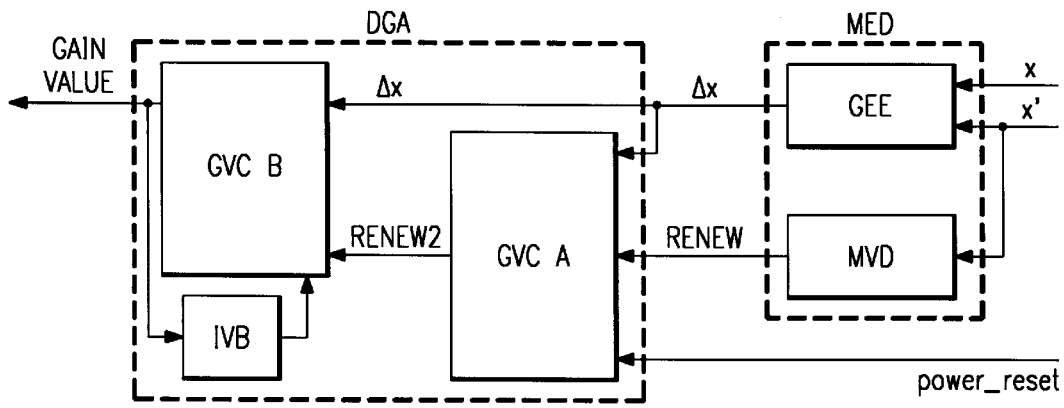
FIG. 23 illustrates a block diagram of a fifth embodiment of the blind AGC system in accordance with the present invention.
Figure 24:
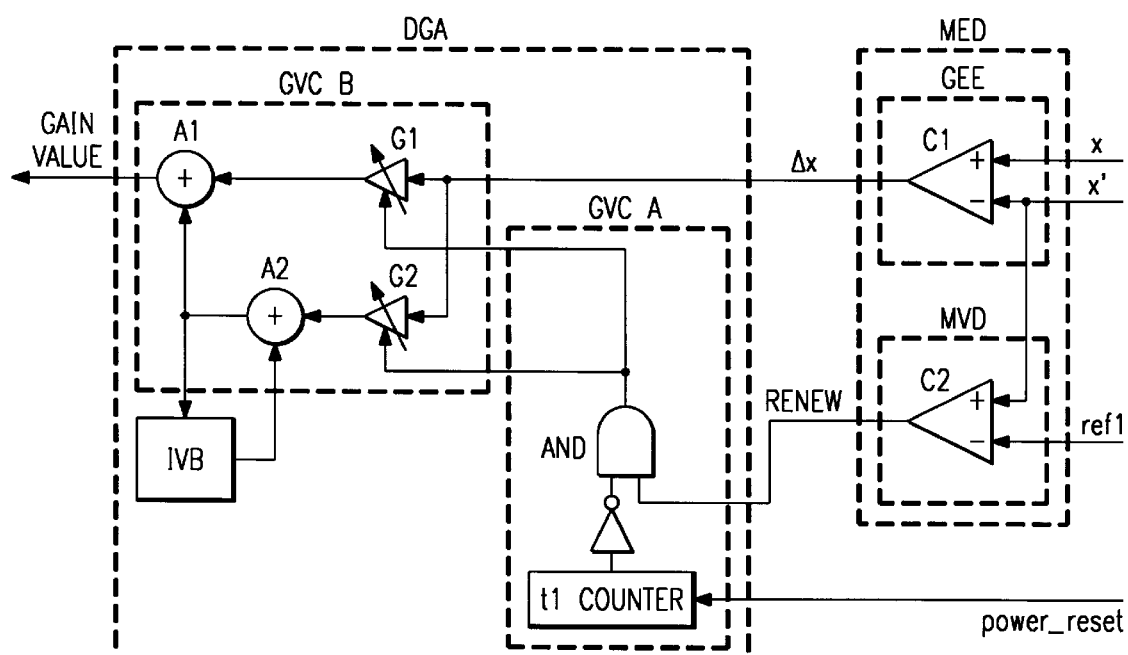
FIGS. 24–27 show more detailed block diagrams of the blind AGC system shown in FIG. 23.
Figure 25:
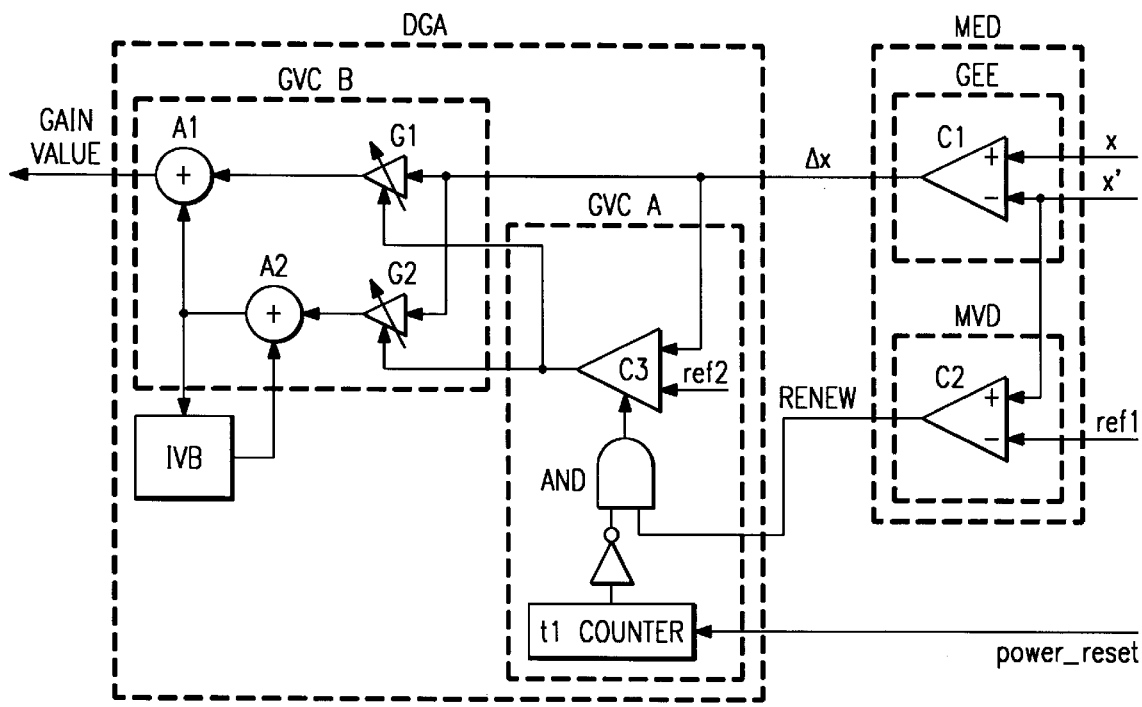
Figure 26:
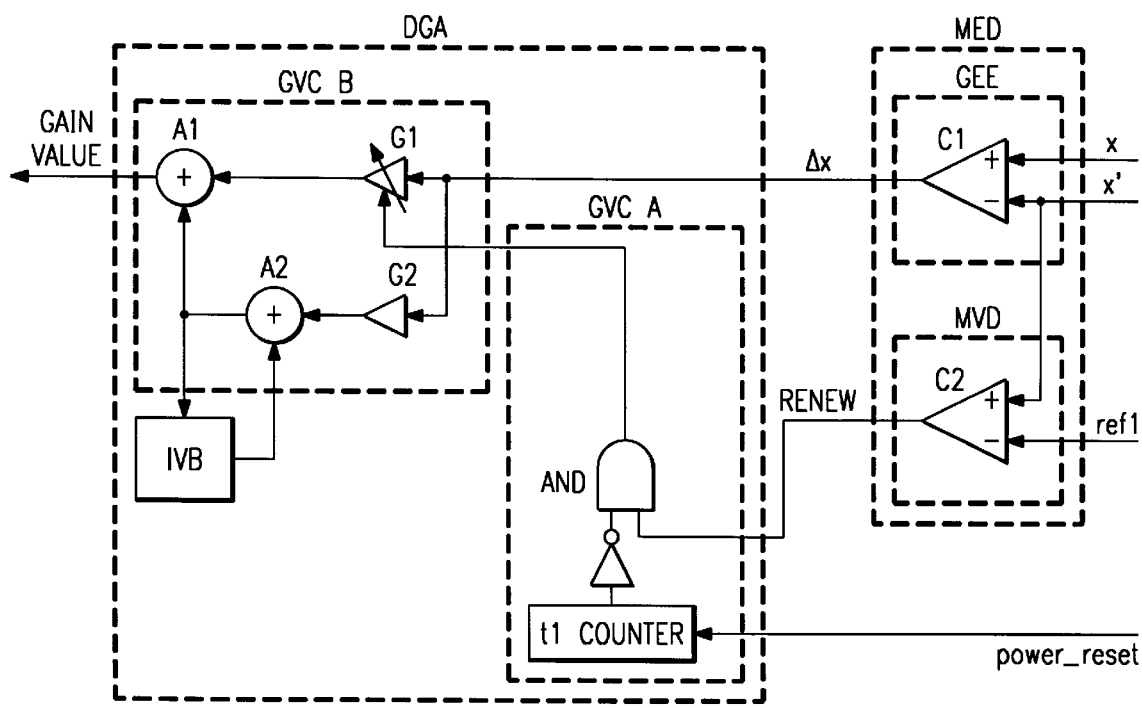
Figure 27:
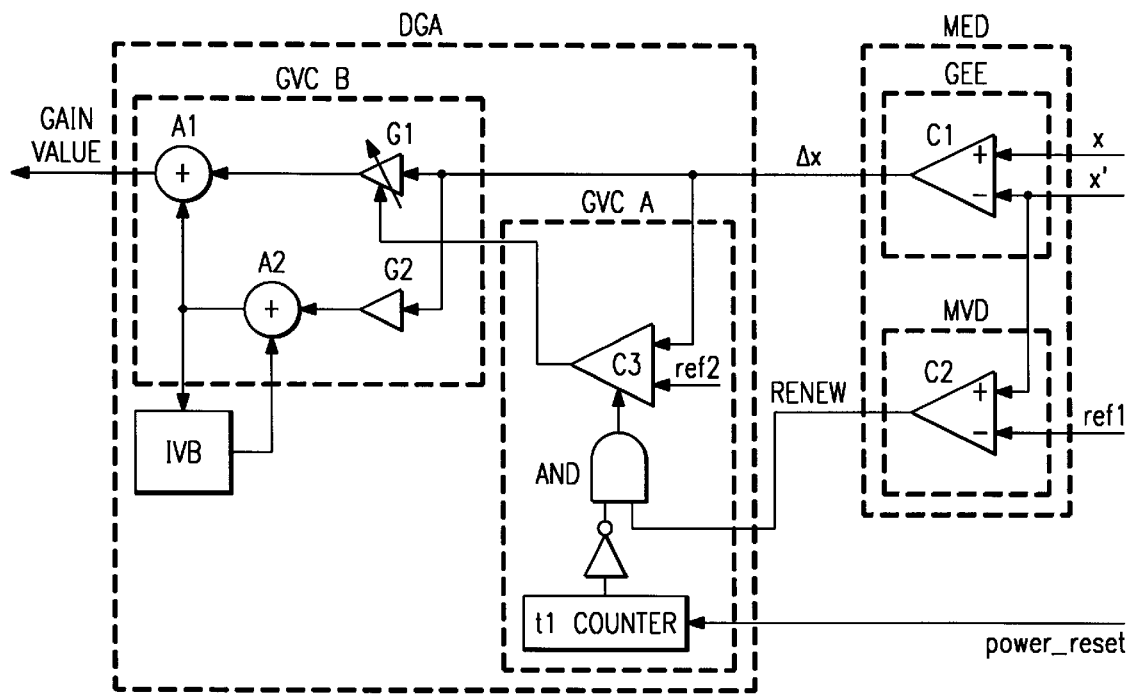

FIG. 23 illustrates the basic implementation in which the thresholding mechanism is built into the loop filtering mechanism and the power_reset signal is not used. FIGS. 24–27 are variations of FIG. 23 where FIGS. 24–25 include both gain G1 192 and gain G2 194 and FIGS. 26–27 include only gain G1 192. In addition, FIGS. 24 and 26 do not include comparator C3 190 but FIGS. 25 and 27 do include comparator C3 190.

FIGS. 28–34 show exemplary digital receivers where the blind AGC system in accordance with the present invention is used. In the case of analog receivers, not shown, the analog to digital converters and slicers shown in FIGS. 28–34 are not needed.

Figure 28:
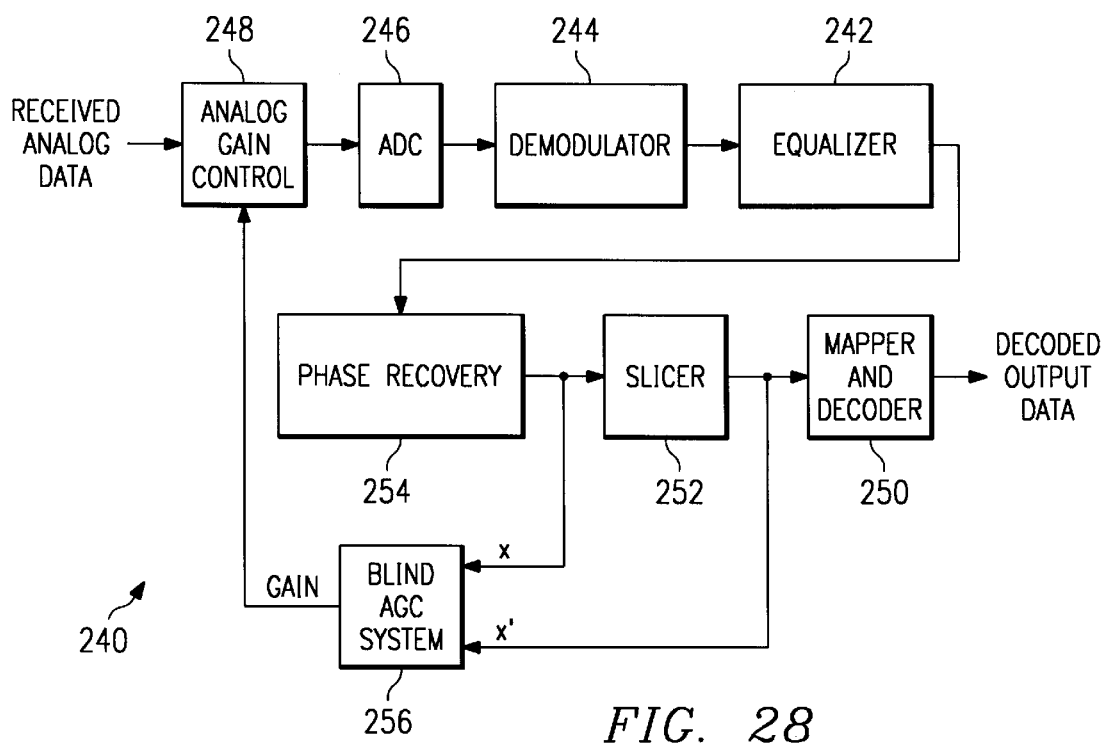
FIGS. 28–34 illustrate block diagrams of various implementations of a digital receiver using a blind AGC system in accordance with the present invention.

In FIG. 28, a received analog signal is input to Analog Gain Control 248. The output signal of the Analog Gain Control 248 is then input into Analog to Digital Converter 246. The output digital signal from the Analog to Digital Converter 246 is input to Demodulator 244. The output demodulated signal from the Demodulator 244 is then equalized in Equalizer 242. The equalized signal output from the Equalizer 242 is input into Phase Recovery 254. The output signal, x, from the Phase Recovery 254 is input into Slicer 252 and a Blind AGC System 256 in accordance with the present invention. In addition, the output signal, x', from the Slicer 252 is also input into the Blind AGC System 256 and into a Mapper & Decoder 250. The Mapper & Decoder 250 provides decoded output data for other applications. Finally, the output gain signal from the Blind AGC System 256 is fed back into the Analog Gain Control 248.

Figure 29:
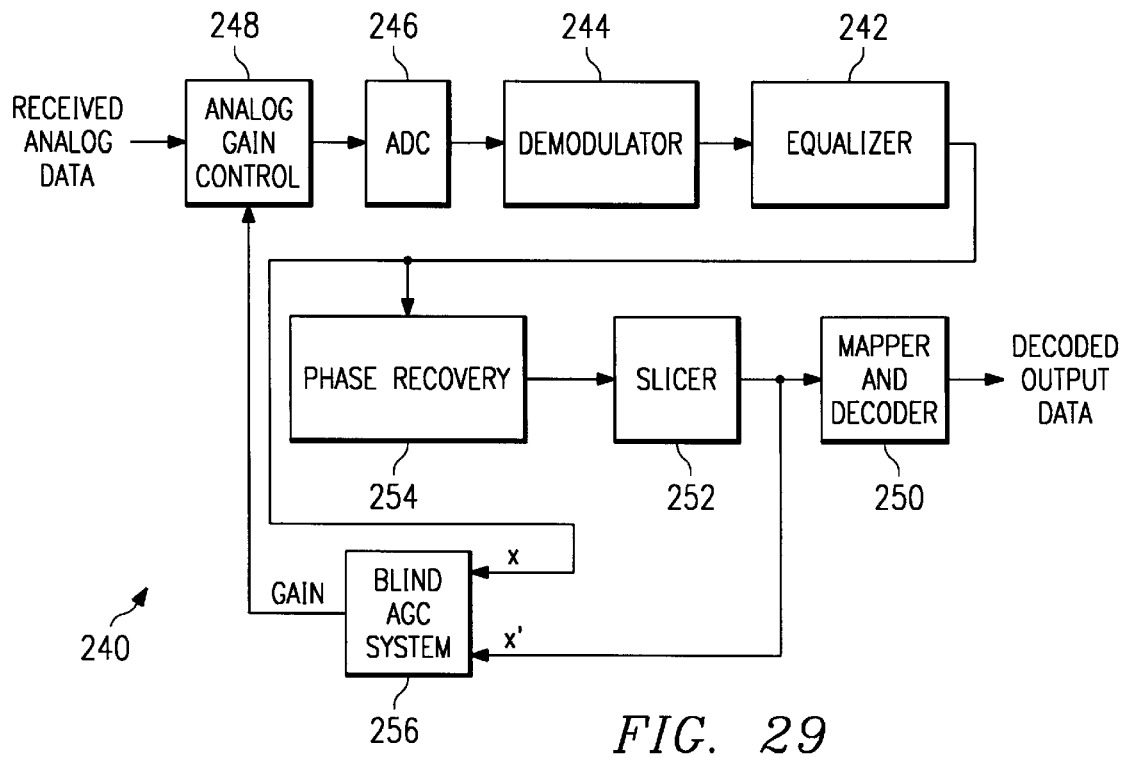

In the digital receiver block diagram in FIG. 29, the output from the Equalizer 242 instead of the output from the Phase Recovery 254 is used as the x input into the Blind AGC system 256.

Figure 30:
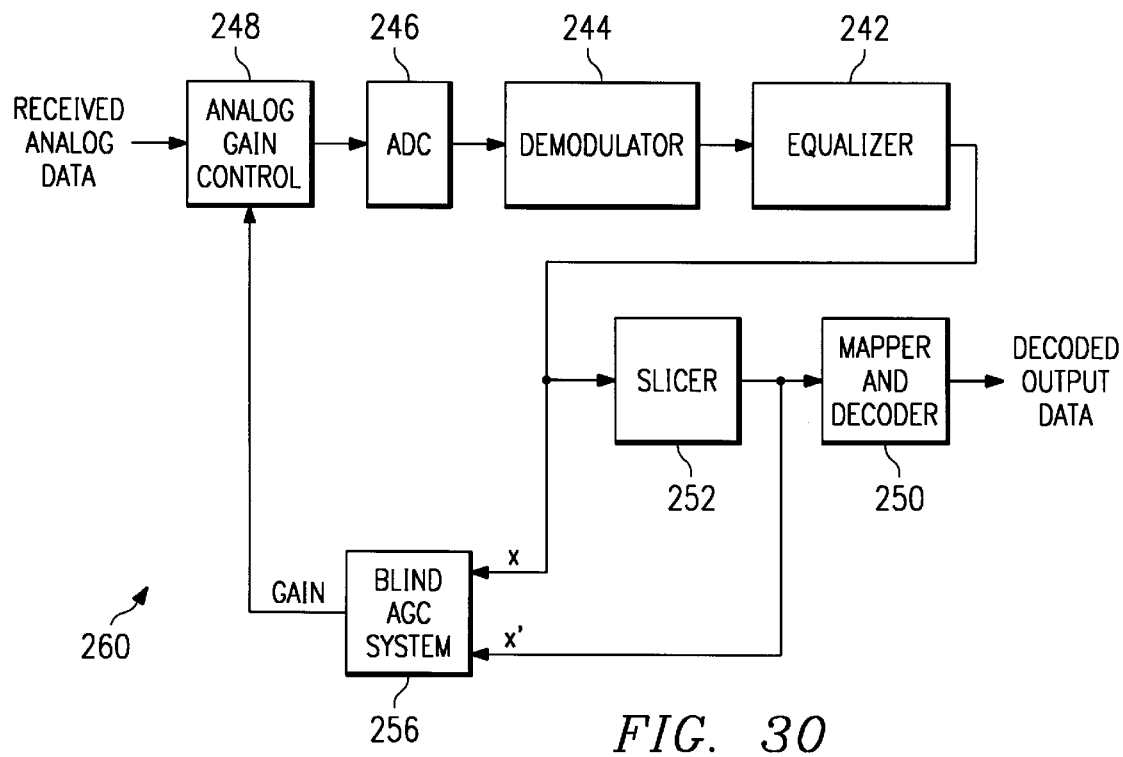

In the digital receiver block diagram in FIG. 30, the Phase Recovery 254, as shown in FIGS. 28–29, is omitted and the output from the Equalizer 242 not only provides the input signal x for the Blind AGC System 256 but also provides the input signal to the Slicer 252.

Figure 31:
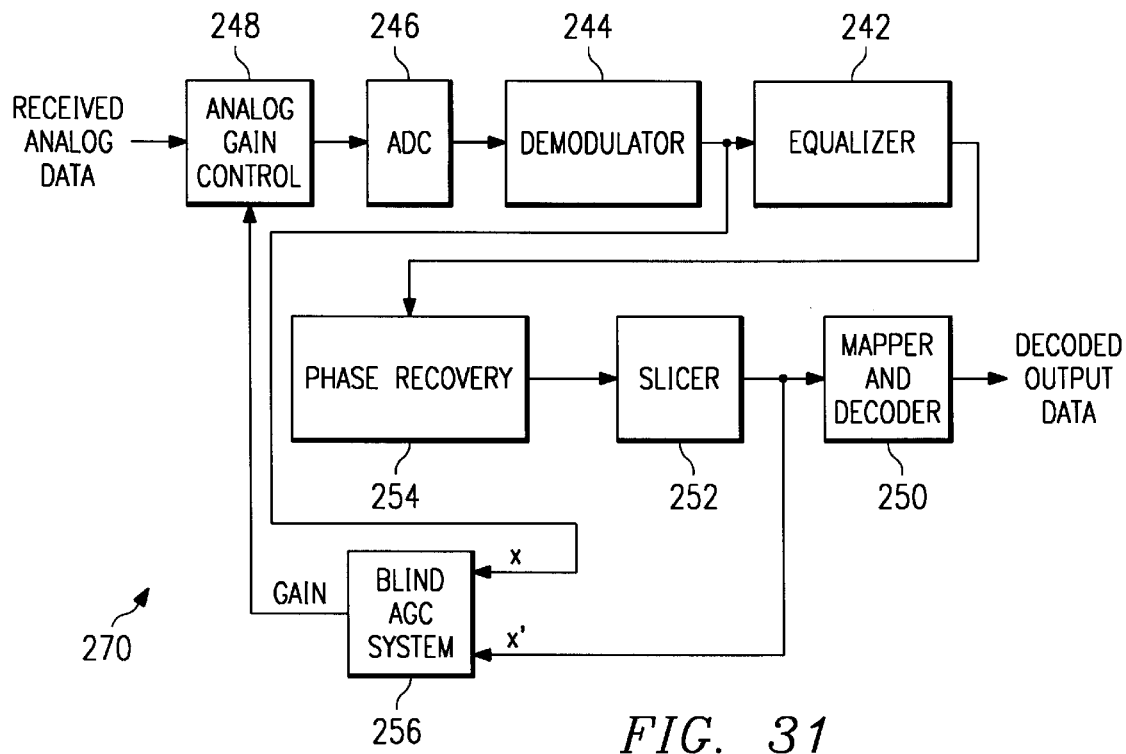

In the digital receiver block diagram shown in FIG. 31, the demodulated output signal from the Demodulator 244 is used as the input signal x into the Blind AGC System 256 and as well as the input signal to the Equalizer 242.

Figure 32:
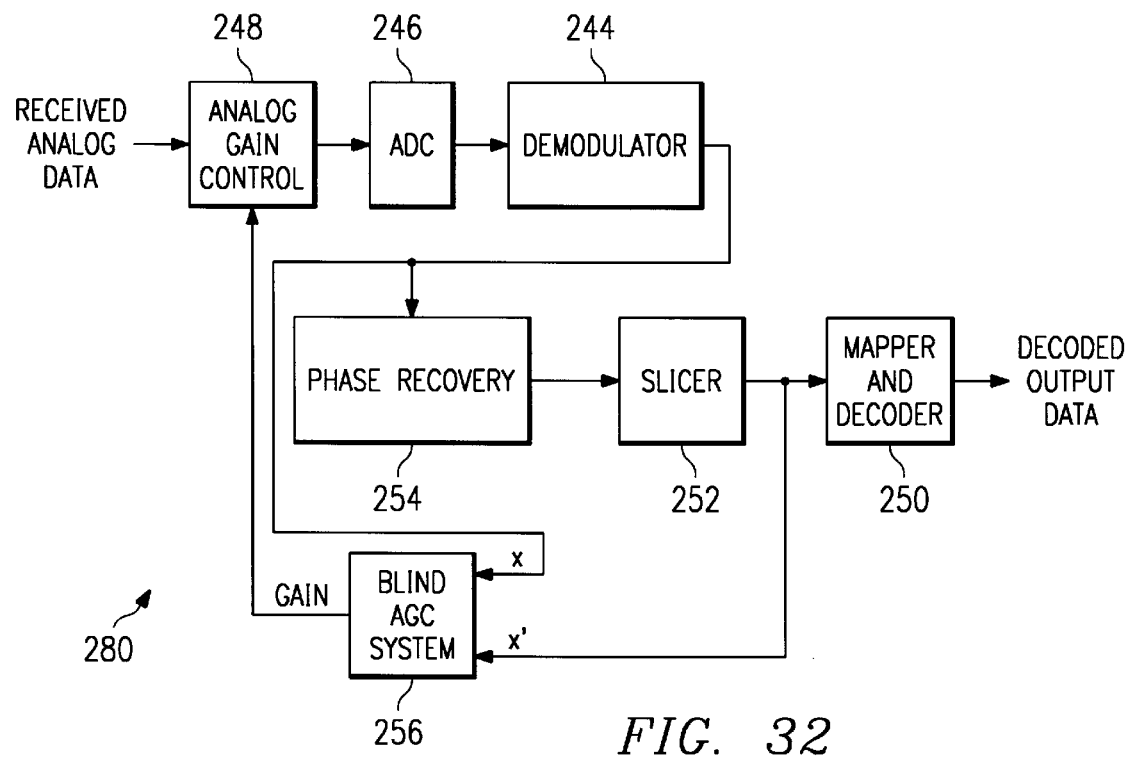

FIG. 32 shows a block diagram of a digital receiver in which the Equalizer 242, as shown in FIGS. 28–31, is omitted. The demodulated output signal from the Demodulator 244 is instead used as input into the Phase Recovery 254 and as the input signal x into the Blind AGC System 256.

Figure 33:
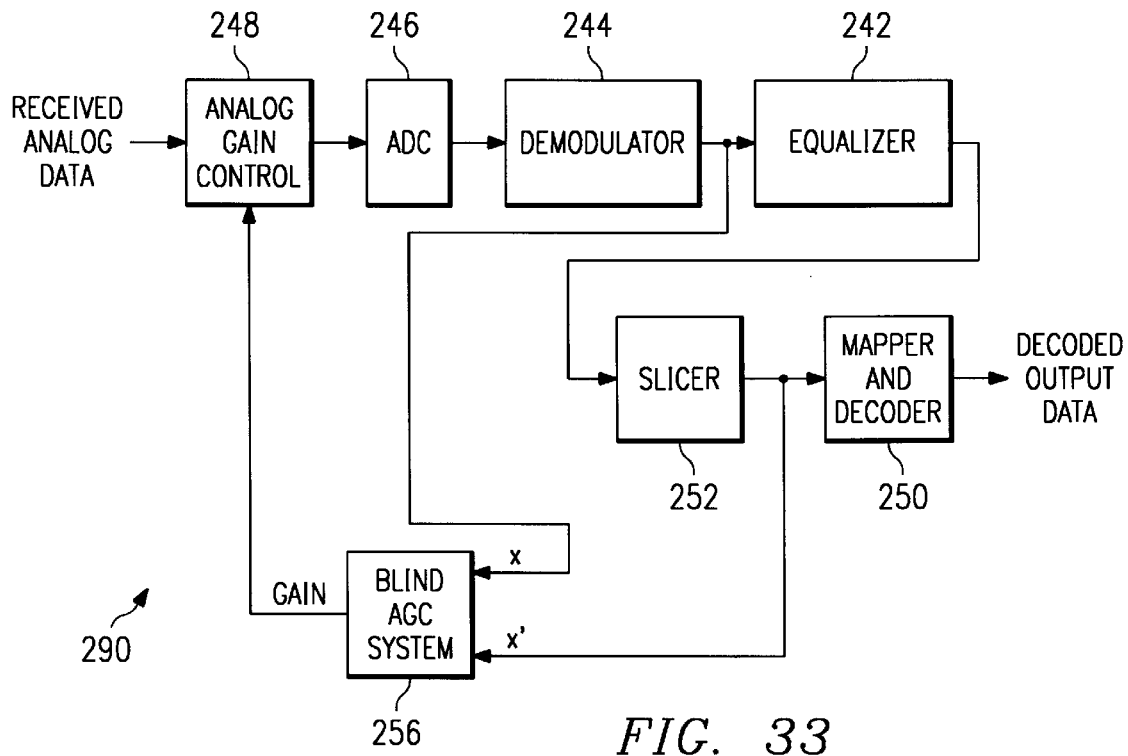

In the digital receiver block diagram in FIG. 33, the Phase Recovery 254, as shown in FIGS. 28–29, FIG. 31 and FIG. 32, is omitted. The demodulated output from the Demodulator 244 provides the input signal x for the Blind AGC System 256. The equalized output signal from the Equalizer 242 is provided as the input signal to the Slicer 252.

Figure 34:
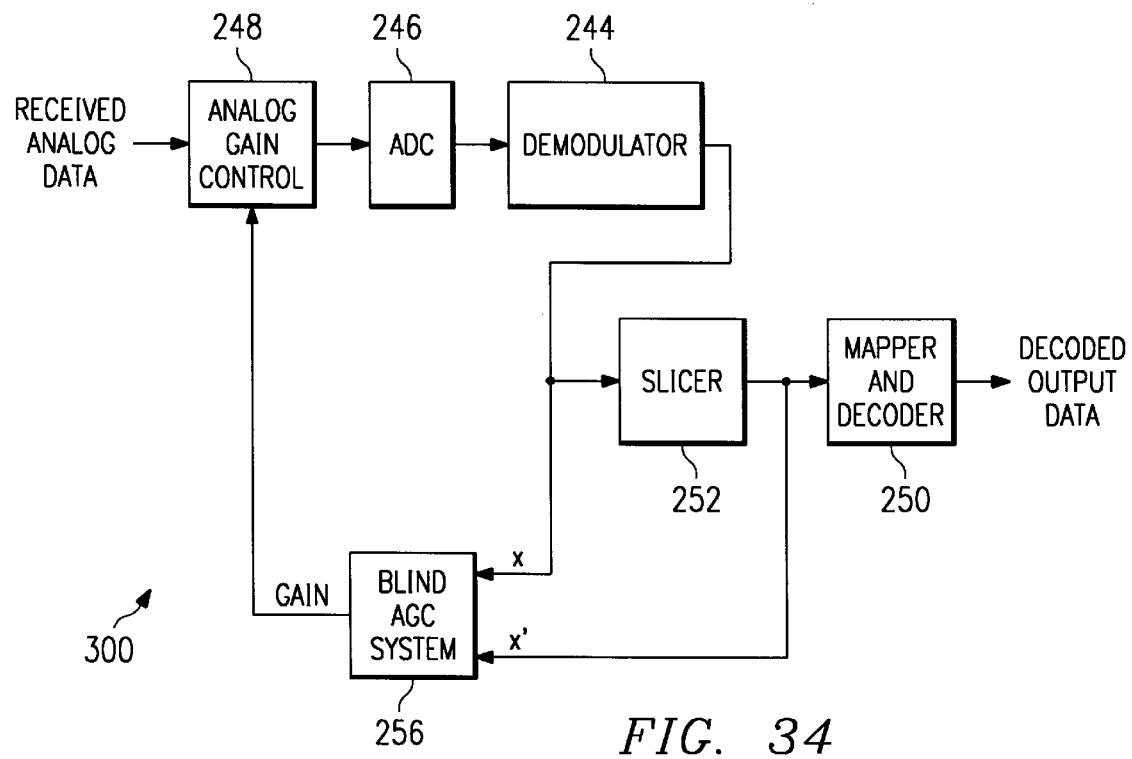

Finally, in the digital receiver block diagram shown in FIG. 34, both the Equalizer 242 and the Phase Recovery 254 are omitted and the demodulated output signal from the Demodulator 244 is used to provide the input signal x to the Blind AGC System 256 and to provide the input signal to the Slicer 252.

Since neither synchronization nor training sequences are required for AGC, the present invention enables a blind communication, and increases the effective bandwidth for data transmission. This eliminates the need to pre-program training sequences into the receivers or to transmit training sequences embedded into the bit stream by the broadcasting stations. As a result, this enables receivers to be compatible with numerous standards. Furthermore, in digital receivers, if there are no training sequences in the transmitted signal, clock jitters do not occur due to abrupt changes of spectral characteristics. This results in an improved BER.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. An apparatus for blind automatic gain control in a digital communications device comprising:
   a gain error evaluator responsive to an input baseband signal and a sliced version of said input baseband signal and operable to generate a gain error signal in accordance with said input baseband signal and said sliced version of said input baseband signal;

a maximum value detector operable to generate a renew signal in accordance with said sliced version of said input baseband signal and a first predetermined reference value;

a gain value adjuster responsive to said gain error evaluator and said maximum value detector and operable to converge said gain error signal in a first state using a first convergence technique and further operable to converge said gain error signal in a second state using a second convergence technique; and said gain value adjuster further operable to generate an output gain value signal from said converged signal.

2. The apparatus of claim 1 wherein said first state exists when said sliced version of said input baseband signal is at least equal to said first predetermined reference value and said gain error signal is at least equal to a second predetermined reference value.

3. The apparatus of claim 1 wherein said gain value adjuster includes a first gain value controller operable to variably amplify said gain error signal in said first state.

4. The apparatus of claim 3 wherein said first gain value controller is further operable to said gain value adjuster in said first state until after a predetermined amount of time has elapsed.

5. The apparatus of claim 1 wherein said second predetermined value is dependent upon the communications device.

6. The apparatus of claim 1 wherein the communications device is a modem.

7. The apparatus of claim 1 wherein the communications device is a receiver.

8. The apparatus of claim 1 wherein the communications device is a transmitter.

9. The apparatus of claim 1 wherein the communications device is a transceiver.

10. The apparatus of claim 1 wherein the communications device is a channel amplifier.

11. A method of controlling gain in a digital communications device comprising the steps of:

generating a gain error signal from an input baseband signal and a sliced version of said input baseband signal;

generating a renew signal in accordance with said sliced version of said input baseband signal and a first predetermined reference value;

amplifying said gain error signal in accordance with a second predetermined reference value;

generating a first converged signal from said amplified gain error signal in a first stage using a first convergence technique;

generating a second converged signal from said amplified gain error signal in a second stage using a second convergence technique; and generating an output gain value from said first converged signal in said first state and from said second converged signal in said second state.

* * * * *